(12) United States Patent
Nakayama et al.

(10) Patent No.: US 11,945,191 B2
(45) Date of Patent: Apr. 2, 2024

(54) LAMINATED GLASS SET AND LAMINATED GLASS STRUCTURE

(71) Applicant: SEKISUI CHEMICAL CO., LTD., Osaka (JP)

(72) Inventors: Kazuhiko Nakayama, Shiga (JP); Hiroaki Inui, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 130 days.

(21) Appl. No.: 17/268,275

(22) PCT Filed: Aug. 20, 2019

(86) PCT No.: PCT/JP2019/032372
§ 371 (c)(1),
(2) Date: Feb. 12, 2021

(87) PCT Pub. No.: WO2020/040115
PCT Pub. Date: Feb. 27, 2020

(65) Prior Publication Data
US 2021/0323276 A1 Oct. 21, 2021

(30) Foreign Application Priority Data
Aug. 20, 2018 (JP) .................................. 2018-154156

(51) Int. Cl.
*B32B 17/10* (2006.01)
*B32B 3/06* (2006.01)
(Continued)

(52) U.S. Cl.
CPC ............ *B32B 17/1066* (2013.01); *B32B 3/06* (2013.01); *B32B 17/10036* (2013.01);
(Continued)

(58) Field of Classification Search
CPC ........ B32B 17/10036; B32B 17/10357; B32B 17/1066; B32B 2250/03; B32B 2250/40;
(Continued)

(56) References Cited

U.S. PATENT DOCUMENTS

| | | |
|---|---|---|
| 2002/0065330 A1 | 5/2002 | Klotzer |
| 2002/0091169 A1 | 7/2002 | Klotzer |

(Continued)

FOREIGN PATENT DOCUMENTS

| | | |
|---|---|---|
| CN | 103302838 | 9/2013 |
| CN | 104781205 | 7/2015 |

(Continued)

OTHER PUBLICATIONS

Extended European Search Report dated Mar. 29, 2022 in European Patent Application No. 19851218.8.

(Continued)

*Primary Examiner* — Alicia J Weydemeyer
(74) *Attorney, Agent, or Firm* — Wenderoth, Lind & Ponack, L.L.P.

(57) ABSTRACT

Provided is a laminated glass set of a plurality of laminated glasses having excellent appearance designability. A laminated glass set according to the present invention is a set of a plurality of laminated glasses, each laminated glass includes an interlayer film part having a colored part, the colored part has a specific gradation part, the gradation part forms a tip of the colored part on the other end side of the interlayer film part, and when distance X from one end of the interlayer film part to a tip of the colored part on the other end side of the interlayer film part is measured in each of the plurality of laminated glasses, the laminated glass set satisfies $(|X_{max}-X_{min}|)/X_{ave} \leq 0.1$, or when distance Y of the colored part in the direction connecting one end and the other end of the interlayer film part is measured in each of (Continued)

the plurality of laminated glasses, the laminated glass set satisfies $(|Y_{max}-Y_{min}|)/Y_{ave} \leq 0.1$.

12 Claims, 12 Drawing Sheets

(51) Int. Cl.
  *B32B 27/08* (2006.01)
  *B32B 27/20* (2006.01)
(52) U.S. Cl.
  CPC .............. *B32B 27/08* (2013.01); *B32B 27/20* (2013.01); *B32B 2264/104* (2013.01); *B32B 2264/502* (2020.08); *B32B 2307/4026* (2013.01)
(58) Field of Classification Search
  CPC ........ B32B 2250/05; B32B 2307/4026; B32B 5/145; B32B 5/142
  See application file for complete search history.

(56) References Cited

U.S. PATENT DOCUMENTS

| | | |
|---|---|---|
| 2003/0032686 A1 | 2/2003 | Klotzer |
| 2005/0084718 A1 | 4/2005 | Tomonaga et al. |
| 2007/0231584 A1 | 10/2007 | Hasegawa |
| 2011/0287265 A1 | 11/2011 | Hasegawa |
| 2013/0229888 A1 | 9/2013 | Asagiri et al. |
| 2015/0204583 A1* | 7/2015 | Stephan .................. F24S 25/67 403/375 |
| 2016/0288460 A1 | 10/2016 | Nakayama et al. |
| 2016/0288465 A1* | 10/2016 | Nakayama ........ B32B 17/10688 |
| 2017/0136743 A1 | 5/2017 | Yoshida et al. |
| 2018/0104934 A1 | 4/2018 | Mori et al. |
| 2018/0117887 A1 | 5/2018 | Nakayama et al. |
| 2020/0070479 A1 | 3/2020 | Nakayama et al. |

FOREIGN PATENT DOCUMENTS

| | | |
|---|---|---|
| CN | 105722802 | 6/2016 |
| CN | 106049730 | 10/2016 |
| CN | 106660866 | 5/2017 |
| EP | 0 464 790 | 1/1992 |
| EP | 2 465 833 | 6/2012 |
| JP | 2003-62891 | 3/2003 |
| JP | 2006-1807 | 1/2006 |
| JP | 2007-55822 | 3/2007 |
| JP | 4105388 | 4/2008 |
| WO | 2006/082800 | 8/2006 |
| WO | 2014/077328 | 5/2014 |
| WO | 2015/072538 | 5/2015 |
| WO | 2016/163486 | 10/2016 |

OTHER PUBLICATIONS

International Preliminary Report on Patentability dated Feb. 23, 2021 in International (PCT) Patent Application No. PCT/JP2019/032372.

International Search Report dated Oct. 29, 2019 in International (PCT) Application No. PCT/JP2019/032372.

Office Action dated Jun. 24, 2022 in corresponding Indian Patent Application No. 202147006281.

* cited by examiner

[FIG. 1]
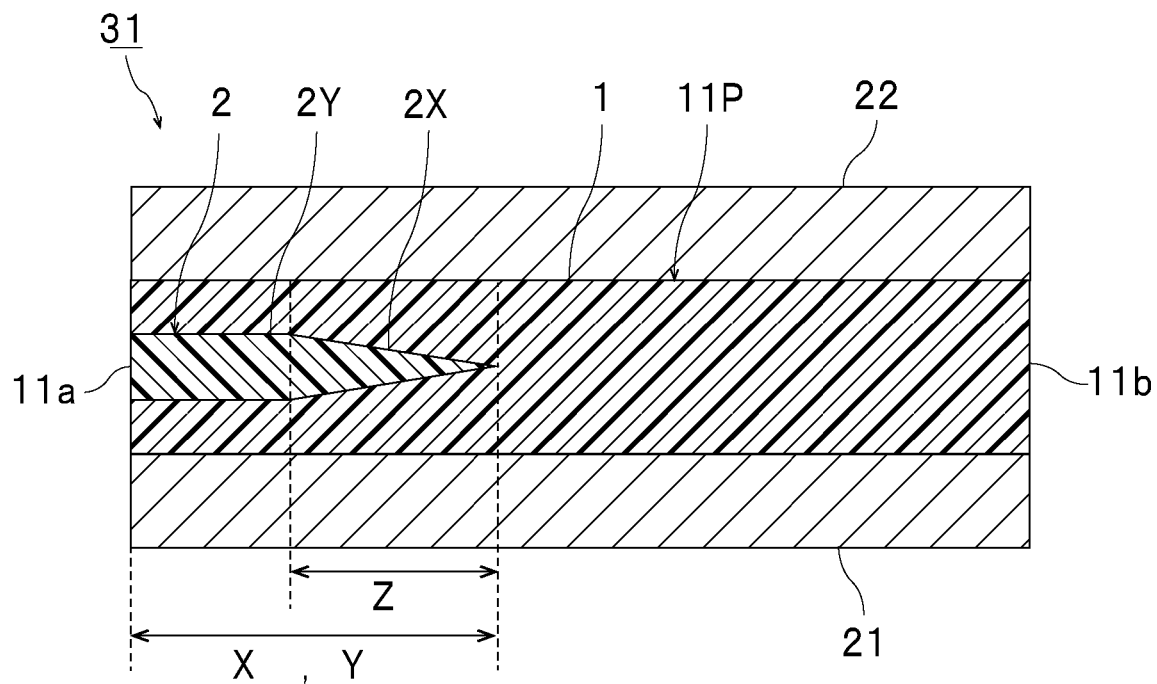
[FIG. 2]
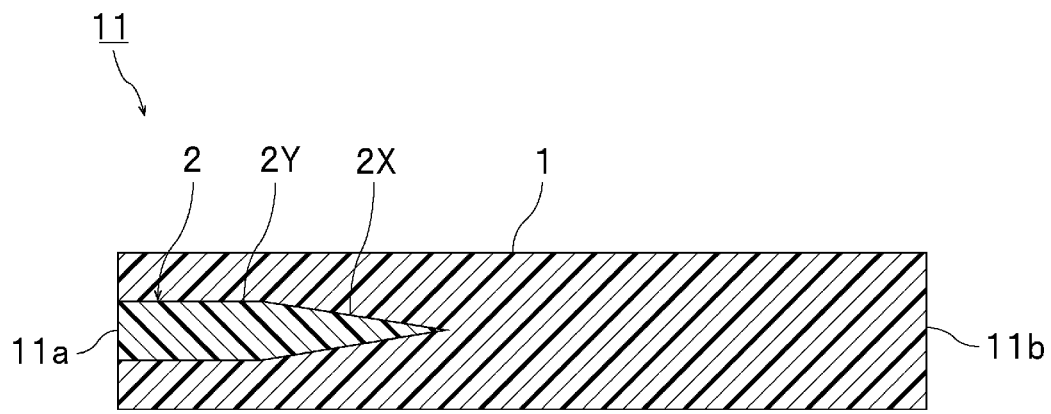

[FIG. 3]
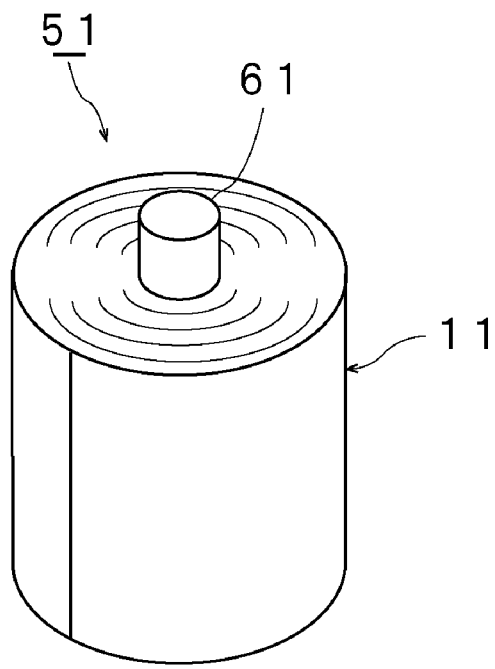
[FIG. 4]
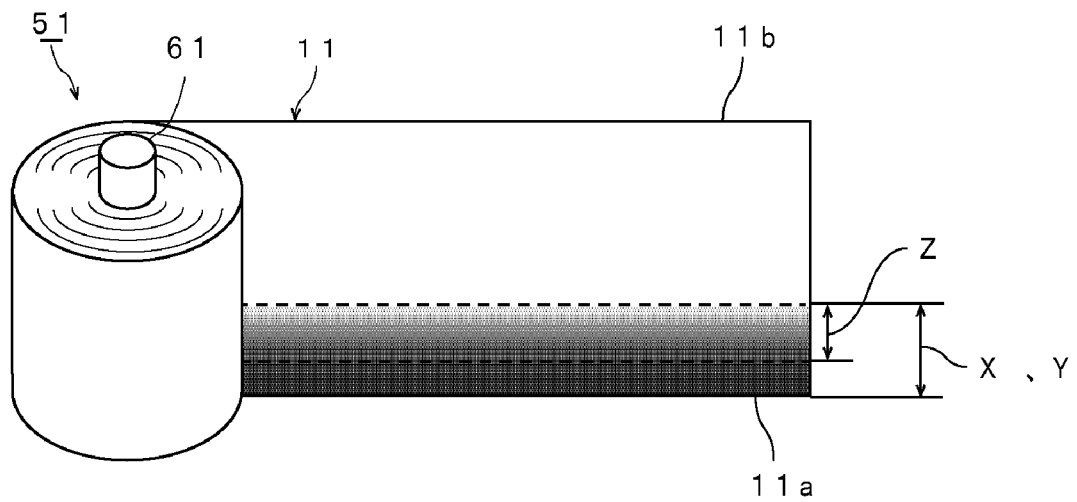

[FIG. 5]
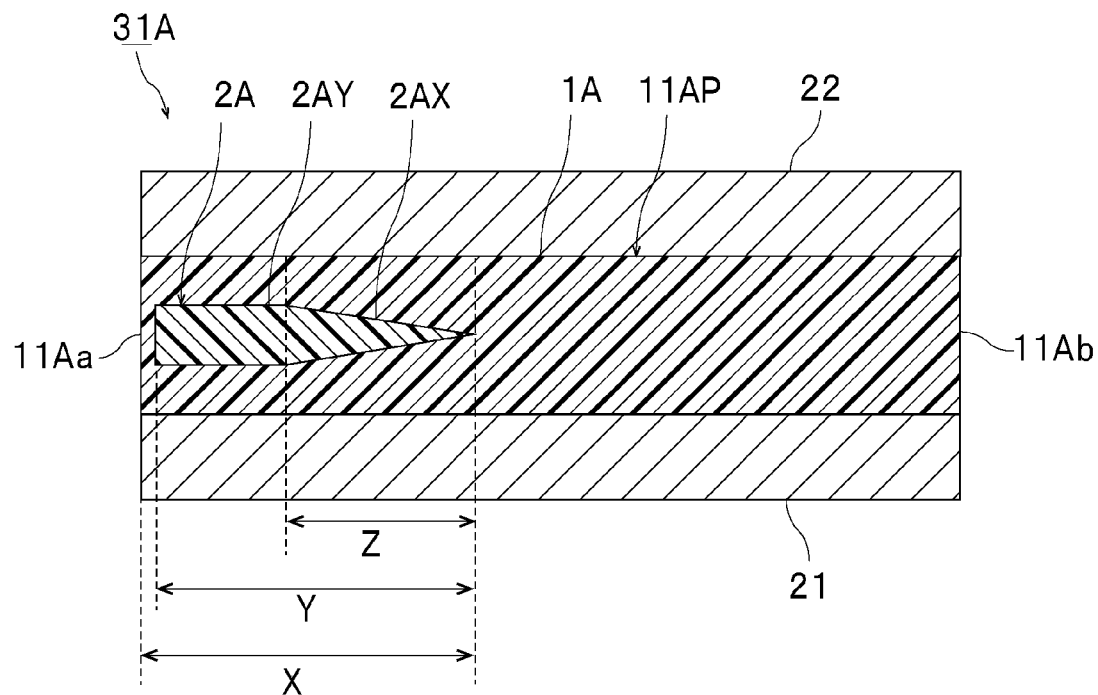
[FIG. 6]
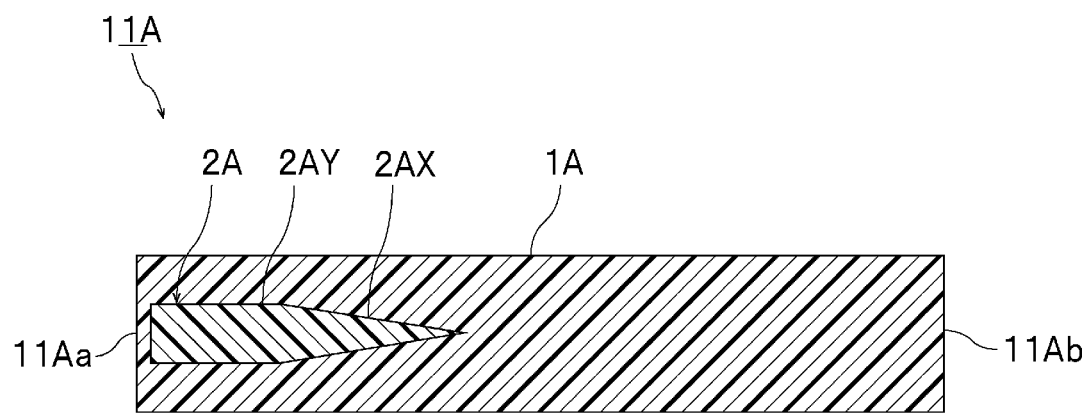

[FIG. 7]
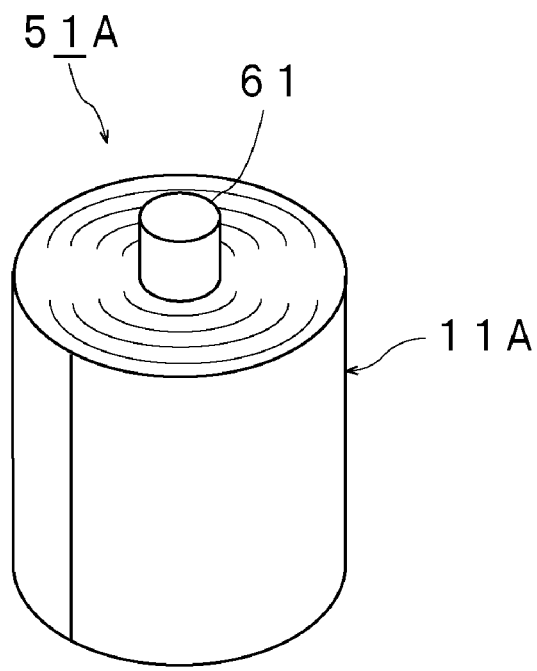
[FIG. 8]
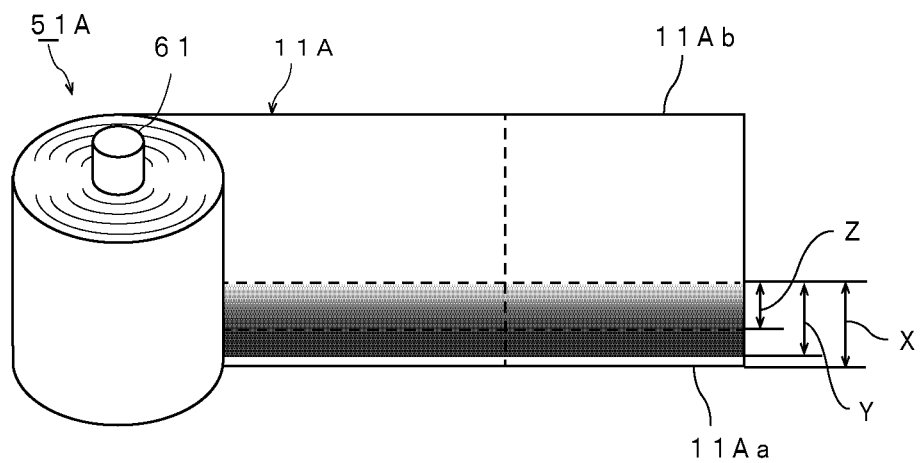

[FIG. 9]
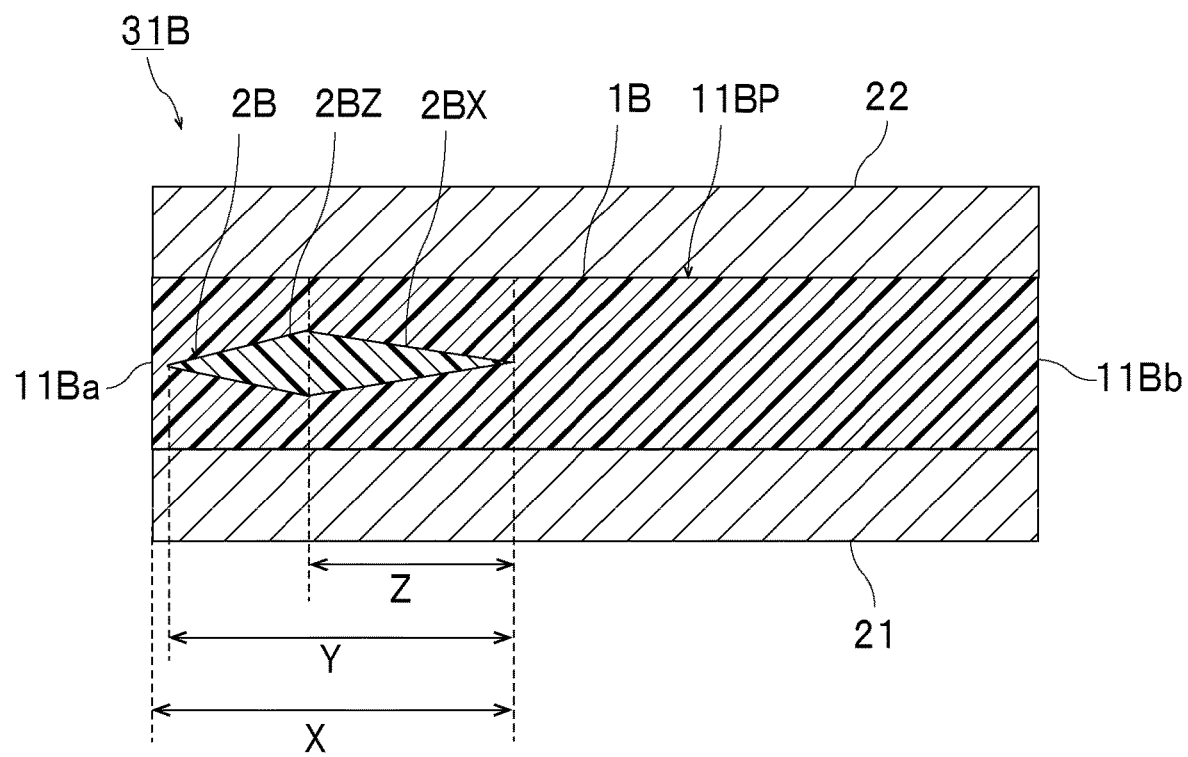
[FIG. 10]
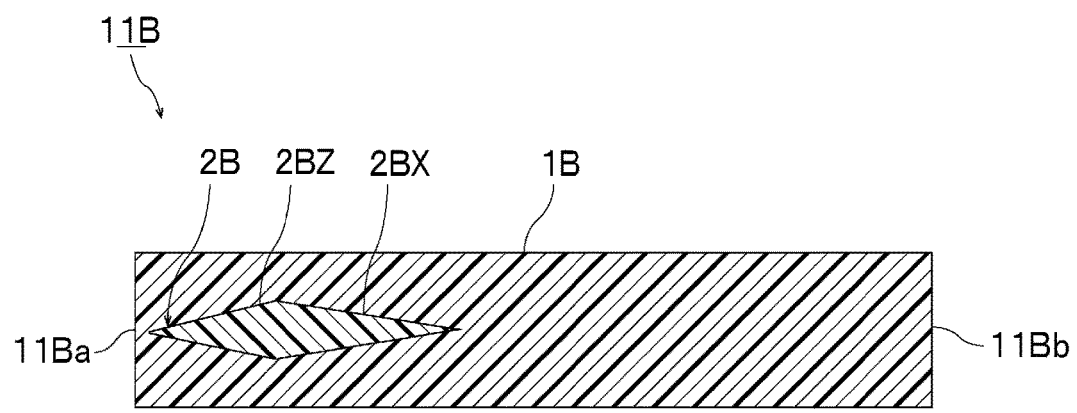

[FIG. 11]
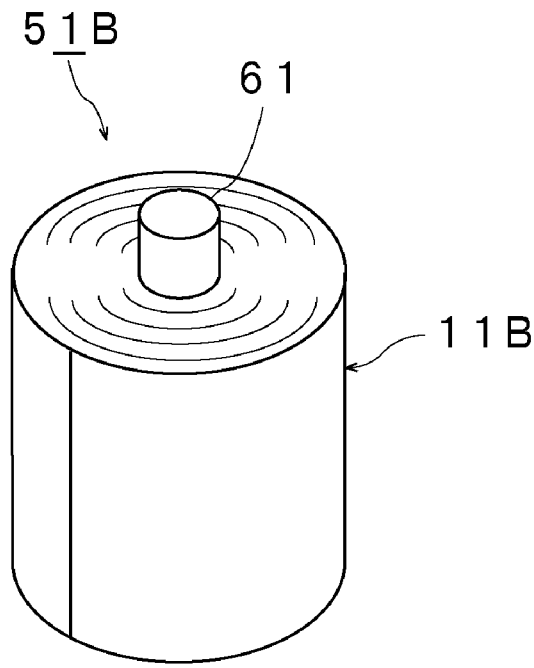
[FIG. 12]
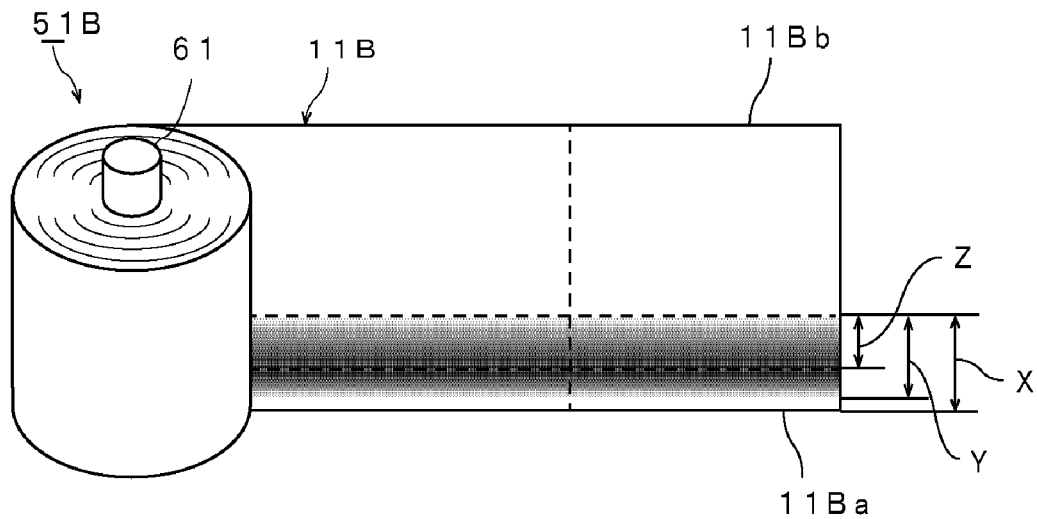

[FIG. 13]
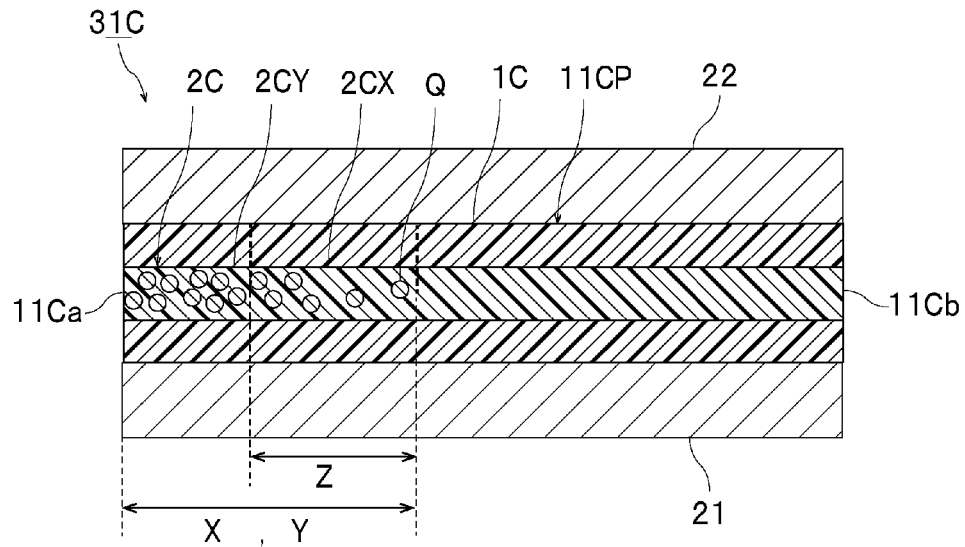
[FIG. 14]
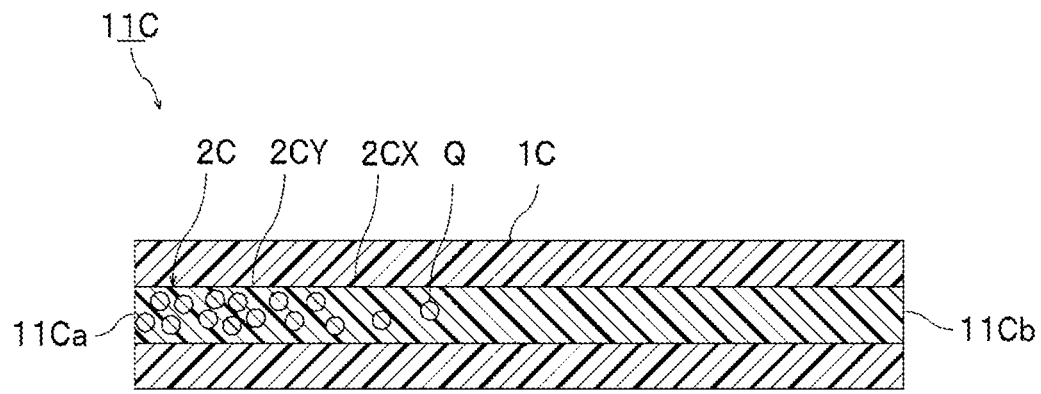
[FIG. 15]
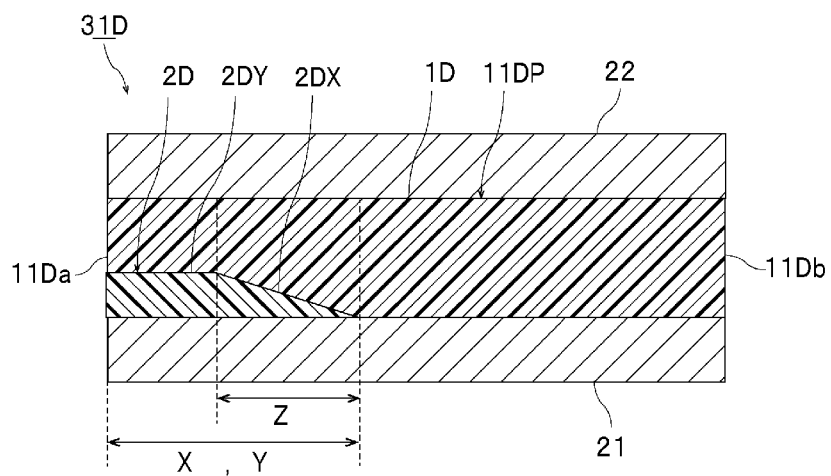

[FIG. 16]
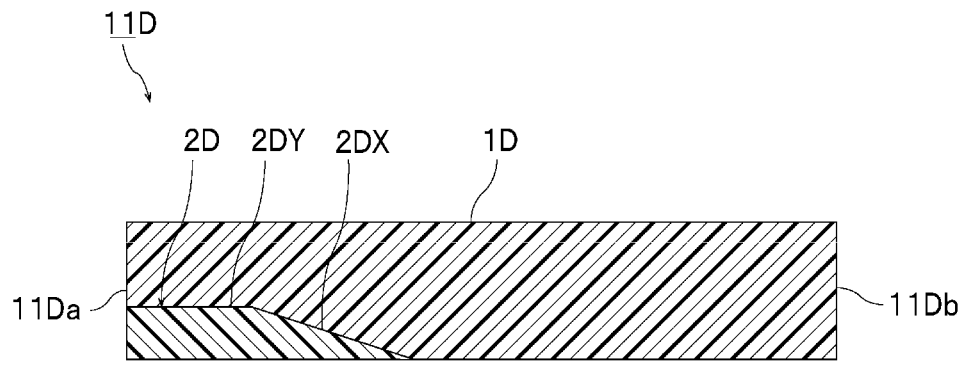
[FIG. 17]
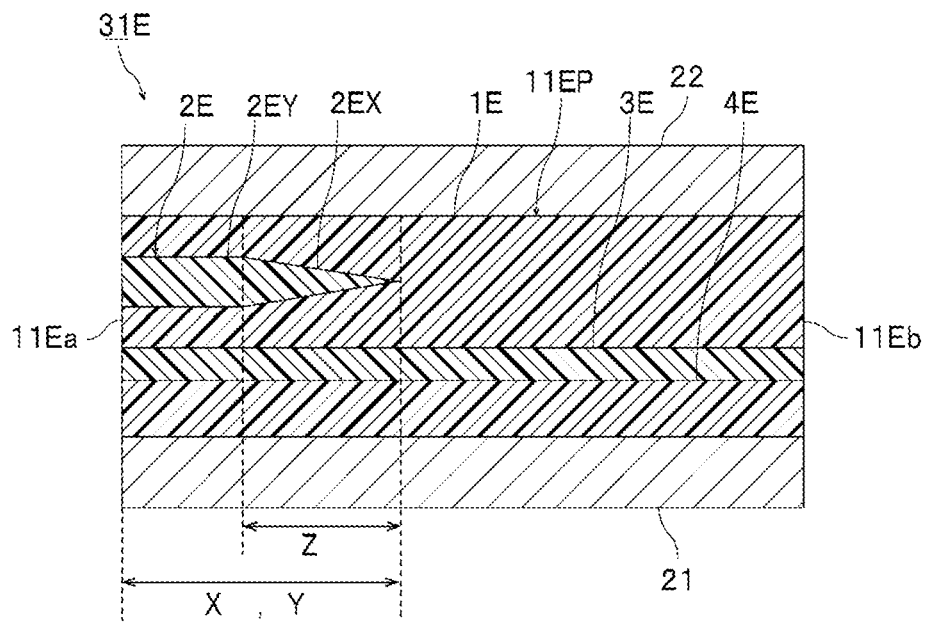
[FIG. 18]
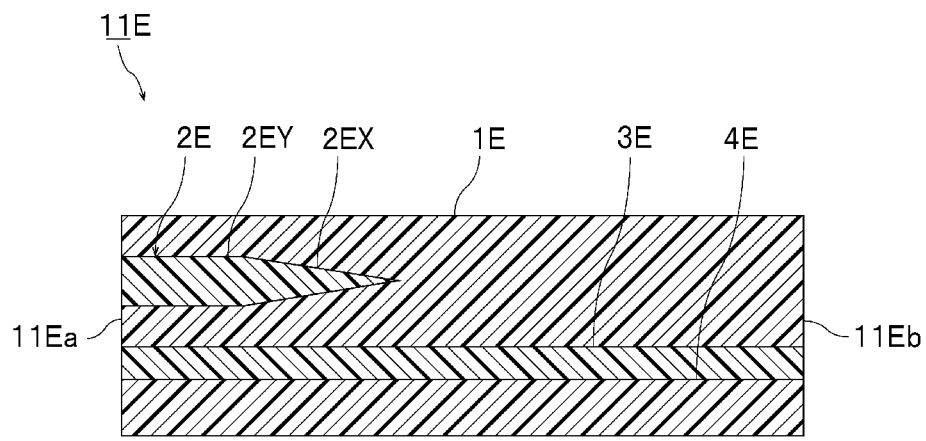

[FIG. 19]
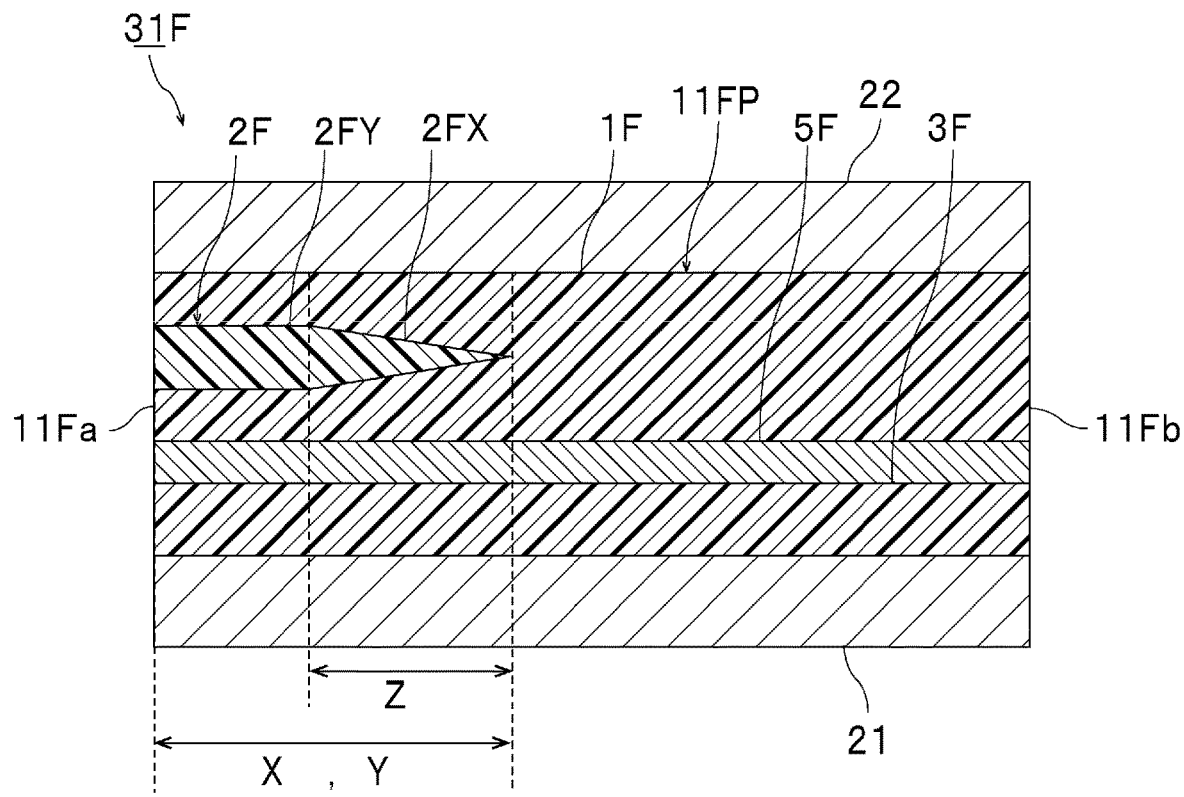
[FIG. 20]
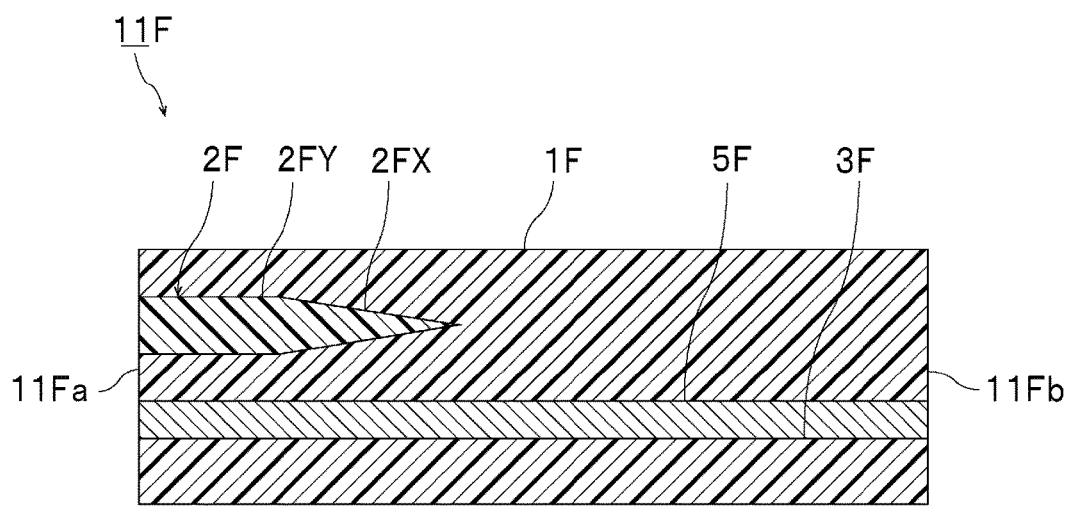

[FIG. 21]
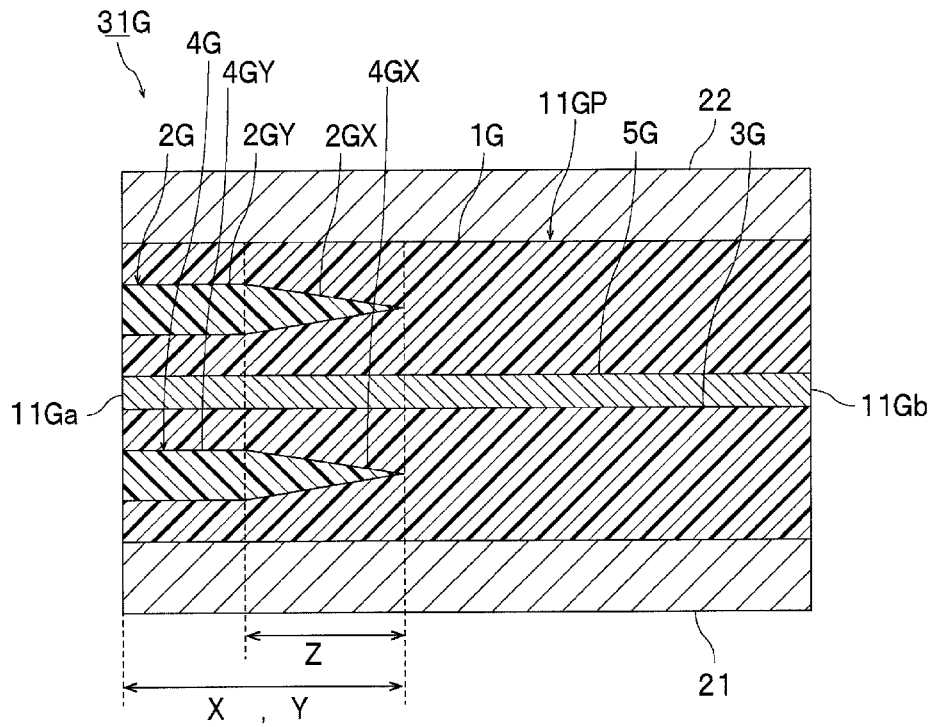
[FIG. 22]
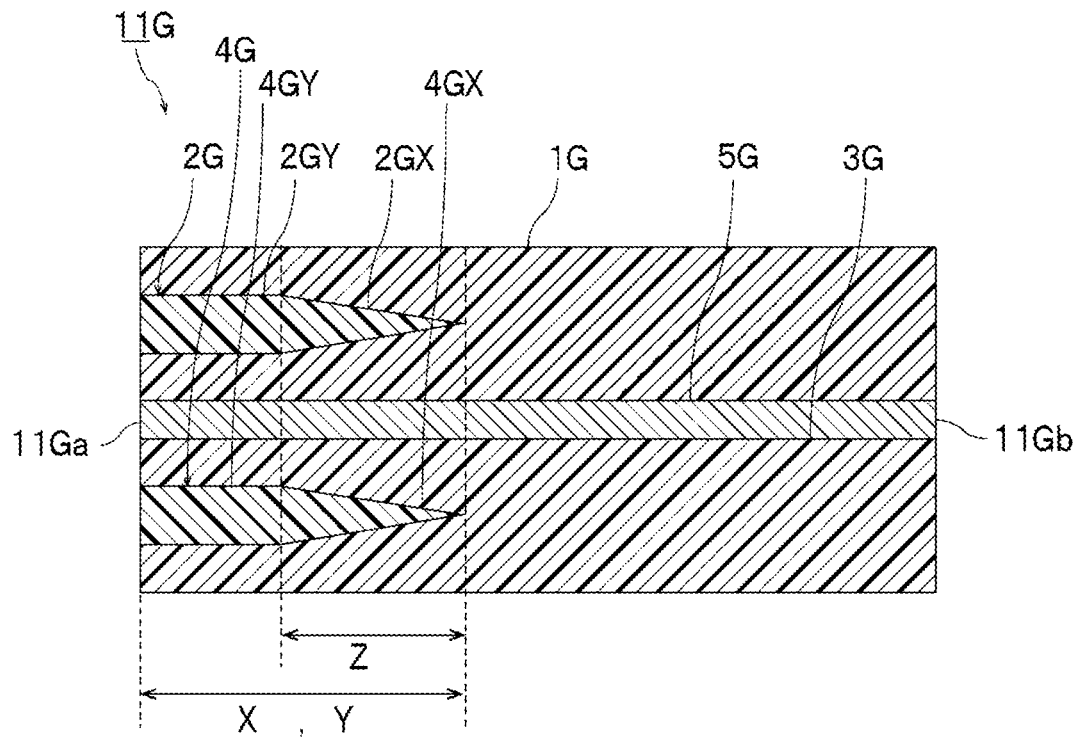

[FIG. 23]
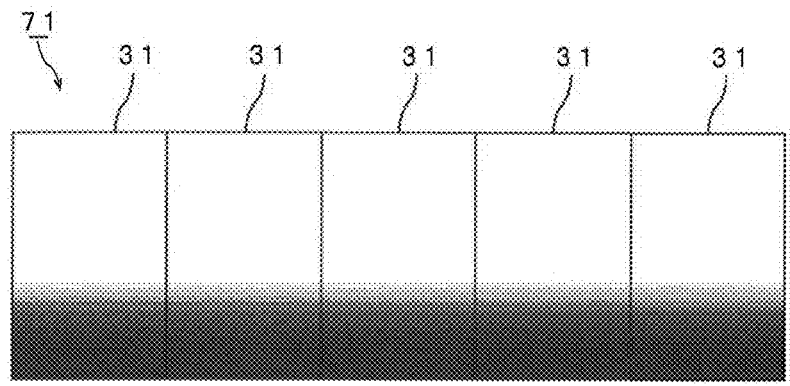
[FIG. 24]
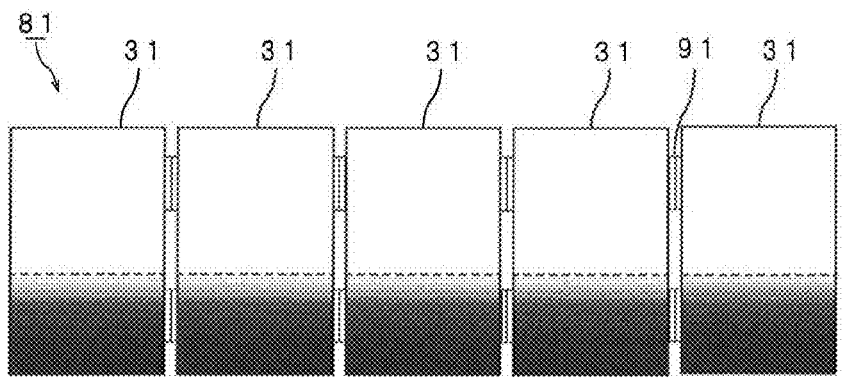
[FIG. 25]
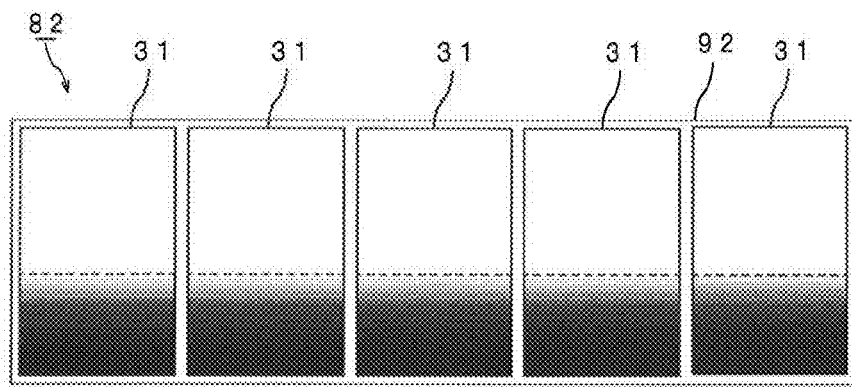

[FIG. 26]
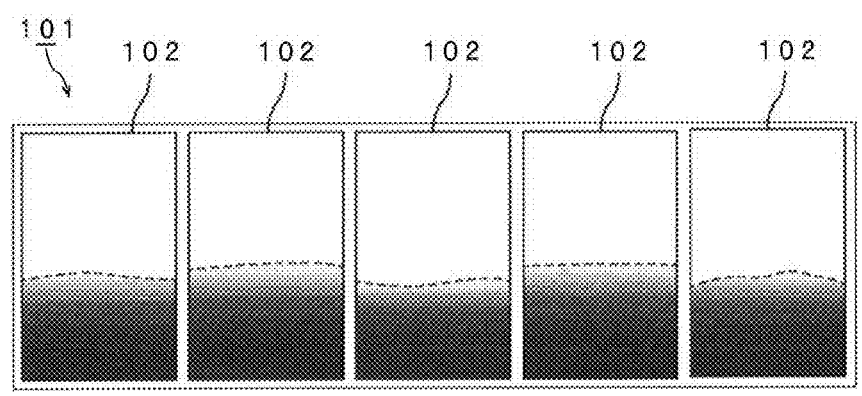

LAMINATED GLASS SET AND LAMINATED GLASS STRUCTURE

TECHNICAL FIELD

The present invention relates to a laminated glass set including an interlayer film for laminated glass having a gradation pattern. Moreover, the present invention relates to a laminated glass structure prepared with the laminated glass set.

BACKGROUND ART

Laminated glass in which an interlayer film for laminated glass is sandwiched between a pair of glass plates is known. The laminated glass is widely used for automobiles, railway vehicles, aircraft, ships, buildings and the like. In recent years, laminated glass having privacy protectability is requested as laminated glass for buildings. In laminated glass having privacy protectability, for example, there is a region where a person or an object located behind the laminated glass is invisible although the region can transmit light.

As one example of laminated glass having privacy protectability, the following Patent Document 1 discloses a laminated glass prepared with a multilayer interlayer film having an opaque layer. In the laminated glass, privacy protectability is achieved by the opaque layer that makes a person or an object located behind the laminated glass invisible.

The laminated glass disclosed in Patent Document 1 faces the problem that the appearance designability is poor because the whole surface of the glass has the same color.

Also, use application of laminated glass has become diversified. In recent years, there has been a demand for laminated glass provided with appearance designability by a gradation pattern as well as the privacy protectability.

The following Patent Documents 2 and 3 disclose a laminated glass prepared with an interlayer film having a gradation pattern.

RELATED ART DOCUMENTS

Patent Documents

Patent Document 1: WO2006/082800A1
Patent Document 2: WO2014/077328A1
Patent Document 3: WO2015/072538A1

SUMMARY OF THE INVENTION

Problems to be Solved by the Invention

The interlayer films in Patent Documents 2 and 3 are provided with appearance designability by a gradation pattern.

The interlayer films as described in Patent Documents 2 and 3 are often formed by extrusion molding. In this case, the extruded interlayer film has a long shape, and has a lengthwise direction and a widthwise direction. In the interlayer film, a gradation pattern in which the color tone varies is provided in the direction connecting one end and the other end in the widthwise direction. The extruded interlayer film can be wound into a roll shape to form a roll body before production of laminated glass.

Also, the interlayer film is cut at predetermined intervals in the lengthwise direction at the time of production of laminated glass. Then, each of the plurality of cut interlayer films is arranged between two glass plates, and thus a plurality of laminated glasses are produced.

The present inventors made diligent efforts, and found that in conventional interlayer films, the width of the region where a gradation pattern is provided varies in the lengthwise direction of the interlayer film. The present inventors found that the width of the region provided with a gradation pattern varies in a plurality of laminated glasses produced by using a plurality of cut interlayer films.

A conventional interlayer film provided with a gradation pattern is frequently used for providing a windshield for vehicle with anti-glare property. In such use of laminated glass, the lengths of the interlayer film and the laminated glass are limited, so that it is relatively rare that variation in the width of the region where the gradation pattern is provided is problematic.

Meanwhile, when laminated glass is used as handrail glass, several to several tens of laminated glasses are arranged in line. In such use of laminated glass, variation in the width of the region where the gradation pattern is provided in the interlayer film becomes obvious, and in a structure in which a plurality of the laminated glasses are arranged in line, the appearance designability is impaired due to partial misalignment in color width of the gradation pattern or the like.

It is an object of the present invention to provide a laminated glass set of a plurality of laminated glasses, having excellent appearance designability.

It is also an object of the present invention to provide a laminated glass structure prepared with the laminated glass set.

Means for Solving the Problems

According to a broad aspect of the present invention, there is provided a laminated glass set that is a set of a plurality of laminated glasses, each of the plurality of laminated glasses including a first lamination glass member, a second lamination glass member, and an interlayer film part arranged between the first lamination glass member and the second lamination glass member, the interlayer film part having one end, and the other end at the opposite side of the one end, the interlayer film part having a colored part, the colored part having a gradation part where visible light transmittance increases from the one end side toward the other end side of the interlayer film part, the gradation part forming a tip of the colored part on the other end side of the interlayer film part, when distance X from the one end of the interlayer film part to a tip of the colored part on the other end side of the interlayer film part is measured in each of the plurality of laminated glasses, a maximum value of distance X is denoted by $X_{max}$, a minimum value of distance X is denoted by $X_{min}$, and an average value of distance X is denoted by $X_{ave}$, the laminated glass set satisfying the following formula (1), or when distance Y of the colored part in a direction connecting the one end and the other end of the interlayer film part is measured in each of the plurality of laminated glasses, a maximum value of distance Y is denoted by $Y_{max}$, a minimum value of distance Y is denoted by $Y_{min}$, and an average value of distance Y is denoted by $Y_{ave}$, the laminated glass set satisfying the following formula (2).

$$(|X_{max}-X_{min}|)/X_{ave} \leq 0.1 \qquad \text{Formula (1)}$$

$$(|Y_{max}-Y_{min}|)/Y_{ave} \leq 0.1 \qquad \text{Formula (2)}$$

In a specific aspect of the laminated glass set according to the present invention, the laminated glass set satisfies the formula (1).

In a specific aspect of the laminated glass set according to the present invention, the $X_{min}$ is 0.6 m or more.

In a specific aspect of the laminated glass set according to the present invention, a tip of the colored part on the one end side of the interlayer film part reaches the one end of the interlayer film part.

In a specific aspect of the laminated glass set according to the present invention, the laminated glass set satisfies the formula (2).

In a specific aspect of the laminated glass set according to the present invention, the $Y_{min}$ is 0.6 m or more.

In a specific aspect of the laminated glass set according to the present invention, when distance Z of the gradation part in the direction connecting the one end and the other end of the interlayer film part is measured in each of the plurality of laminated glasses, a maximum value of distance Z is denoted by $Z_{max}$, a minimum value of distance Z is denoted by $Z_{min}$, and an average value of distance Z is denoted by $Z_{ave}$, the laminated glass set satisfies the following formula (3).

$$(|Z_{max}-Z_{min}|)/Z_{ave} \leq 0.1 \quad \text{Formula (3)}$$

In a specific aspect of the laminated glass set according to the present invention, the interlayer film part includes a first resin layer and a second resin layer, the first resin layer is arranged on a first surface side of the second resin layer, the second resin layer contains a coloring agent, and the second resin layer forms the colored part.

In a specific aspect of the laminated glass set according to the present invention, the coloring agent includes calcium carbonate particles.

In a specific aspect of the laminated glass set according to the present invention, the first resin layer is arranged on a second surface opposite to the first surface of the second resin layer.

In a specific aspect of the laminated glass set according to the present invention, the colored part has a dark color part having uniform visible light transmittance from the one end side toward the other end side of the interlayer film part, and in the interlayer film part, the dark color part is located closer to the one end of the interlayer film part than the gradation part.

According to a broad aspect of the present invention, there is provided a laminated glass structure comprising the laminated glass set as described above, and a connecting member that connects the plurality of laminated glasses in the laminated glass set.

Effect of the Invention

A laminated glass set according to the present invention is a set of a plurality of laminated glasses. In the laminated glass set according to the present invention, each of the plurality of laminated glasses includes a first lamination glass member, a second lamination glass member, and an interlayer film part arranged between the first lamination glass member and the second lamination glass member. In the laminated glass set according to the present invention, the interlayer film part has one end, and the other end at the opposite side of the one end. In the laminated glass set according to the present invention, the interlayer film part has a colored part. In the laminated glass set according to the present invention, the colored part has a gradation part where visible light transmittance increases from the one end side toward the other end side of the interlayer film part, and the gradation part forms a tip of the colored part on the other end side of the interlayer film part. In each of the plurality of laminated glasses, distance X from the one end of the interlayer film part to a tip of the colored part on the other end side of the interlayer film part is measured, a maximum value of distance X is denoted by $X_{max}$, a minimum value of distance X is denoted by $X_{min}$, and an average value of distance X is denoted by $X_{ave}$. In each of the plurality of laminated glasses, distance Y of the colored part in the direction connecting the one end and the other end of the interlayer film part is measured, a maximum value of distance Y is denoted by $Y_{max}$, a minimum value of distance Y is denoted by $Y_{min}$, and an average value of distance Y is denoted by $Y_{ave}$. In the laminated glass set according to the present invention, the laminated glass set satisfies the above formula (1) or satisfies the above formula (2). The laminated glass set according to the present invention is excellent in appearance designability because the aforementioned general configuration is provided.

BRIEF DESCRIPTION OF DRAWINGS

FIG. 1 is a sectional view schematically showing a laminated glass in a laminated glass set in accordance with a first embodiment of the present invention.

FIG. 2 is a sectional view schematically showing an interlayer film for use in obtaining the laminated glass shown in FIG. 1.

FIG. 3 is a perspective view schematically showing a roll body prepared by winding the interlayer film shown in FIG. 2.

FIG. 4 is a perspective view schematically showing a partially developed state of a roll body prepared by winding the interlayer film shown in FIG. 2.

FIG. 5 is a sectional view schematically showing a laminated glass in a laminated glass set in accordance with a second embodiment of the present invention.

FIG. 6 is a sectional view schematically showing an interlayer film for use in obtaining the laminated glass shown in FIG. 5.

FIG. 7 is a perspective view schematically showing a roll body prepared by winding the interlayer film shown in FIG. 6.

FIG. 8 is a perspective view schematically showing a partially developed state of a roll body prepared by winding the interlayer film shown in FIG. 6.

FIG. 9 is a sectional view schematically showing a laminated glass in a laminated glass set in accordance with a third embodiment of the present invention.

FIG. 10 is a sectional view schematically showing an interlayer film for use in obtaining the laminated glass shown in FIG. 9.

FIG. 11 is a perspective view schematically showing a roll body prepared by winding the interlayer film shown in FIG. 10.

FIG. 12 is a perspective view schematically showing a partially developed state of a roll body prepared by winding the interlayer film shown in FIG. 10.

FIG. 13 is a sectional view schematically showing a laminated glass in a laminated glass set in accordance with a fourth embodiment of the present invention.

FIG. 14 is a sectional view schematically showing an interlayer film for use in obtaining the laminated glass shown in FIG. 13.

FIG. 15 is a sectional view schematically showing a laminated glass in a laminated glass set in accordance with a fifth embodiment of the present invention.

FIG. 16 is a sectional view schematically showing an interlayer film for use in obtaining the laminated glass shown in FIG. 15.

FIG. 17 is a sectional view schematically showing a laminated glass in a laminated glass set in accordance with a sixth embodiment of the present invention.

FIG. 18 is a sectional view schematically showing an interlayer film for use in obtaining the laminated glass shown in FIG. 17.

FIG. 19 is a sectional view schematically showing a laminated glass in a laminated glass set in accordance with a seventh embodiment of the present invention.

FIG. 20 is a sectional view schematically showing an interlayer film for use in obtaining the laminated glass shown in FIG. 19.

FIG. 21 is a sectional view schematically showing a laminated glass in a laminated glass set in accordance with an eighth embodiment of the present invention.

FIG. 22 is a sectional view schematically showing an interlayer film for use in obtaining the laminated glass shown in FIG. 21.

FIG. 23 is a front view showing a laminated glass set including a plurality of laminated glasses shown in FIG. 1.

FIG. 24 is a front view showing the first example of a laminated glass structure using the laminated glass set shown in FIG. 23.

FIG. 25 is a front view showing the second example of a laminated glass structure using the laminated glass set shown in FIG. 23.

FIG. 26 is a front view showing a laminated glass structure prepared with a conventional laminated glass set.

MODES FOR CARRYING OUT THE INVENTION

Hereinafter, the present invention will be described in detail.

A laminated glass set according to the present invention is a set of a plurality of laminated glasses. A laminated glass included in one set of the laminated glass set corresponds to one laminated glass included in the later-described laminated glass structure.

In the laminated glass set according to the present invention, each of the plurality of laminated glasses includes a first lamination glass member, a second lamination glass member, and an interlayer film part arranged between the first lamination glass member and the second lamination glass member.

In the laminated glass set according to the present invention, the interlayer film part has one end, and the other end at the opposite side of the one end. The one end and the other end are end parts of both sides facing each other in the interlayer film part.

In the laminated glass set according to the present invention, the interlayer film part has a colored part. The colored part extends from one end side toward the other end side of the interlayer film part.

In the laminated glass set according to the present invention, the colored part has a gradation part where visible light transmittance increases from the one end side toward the other end side of the interlayer film part. The gradation part is a part where visible light transmittance increases from the one end side toward the other end side of the interlayer film part. By the variation in visible light transmittance, the color tone of the gradation part varies. For example, in the gradation part, the color tone becomes lighter from the one end side toward the other end side of the interlayer film part.

The gradation part forms a tip of the colored part on the other end side of the interlayer film part. The tip of the part where visible light transmittance increases from the one end side toward the other end side of the interlayer film part is a tip of the gradation part.

In each of the plurality of laminated glasses, distance X from the one end of the interlayer film part to a tip of the colored part on the other end side of the interlayer film part is measured. In the laminated glass set according to the present invention, a maximum value of distance X is denoted by $X_{max}$, a minimum value of distance X is denoted by $X_{min}$, and an average value of distance X is denoted by $X_{ave}$. It is preferred that the laminated glass set according to the present invention satisfy the following formula (1). That is, in the laminated glass set according to the present invention, it is preferred that a ratio of an absolute value of difference between $X_{max}$ and $X_{min}$, to $X_{ave}$ be 0.1 or less.

$$(|X_{max}-X_{min}|)/X_{ave} \leq 0.1 \quad \text{Formula (1)}$$

In each of the plurality of laminated glasses, distance Y of the colored part in the direction connecting the one end and the other end of the interlayer film part is measured. In the laminated glass set according to the present invention, a maximum value of distance Y is denoted by $Y_{max}$, a minimum value of distance Y is denoted by $Y_{min}$, and an average value of distance Y is denoted by $Y_{ave}$. It is preferred that the laminated glass set according to the present invention satisfy the following formula (2). That is, in the laminated glass set according to the present invention, it is preferred that a ratio of an absolute value of difference between $Y_{max}$ and $Y_{min}$, to $Y_{ave}$ be 0.1 or less.

$$(|Y_{max}-Y_{min}|)/Y_{ave} \leq 0.1 \quad \text{Formula (2)}$$

The laminated glass set according to the present invention may satisfy the formula (1), may satisfy the formula (2), or may satisfy both the formula (1) and the formula (2).

The laminated glass set according to the present invention is excellent in appearance designability because the aforementioned general configuration is provided. For example, when a plurality of laminated glasses are arranged, the colored parts can be aligned, and thus the appearance designability is enhanced.

From the viewpoint of further enhancing the appearance designability, it is preferred that the laminated glass set satisfy both the formula (1) and the formula (2).

In each of the plurality of laminated glasses, distance Z of the gradation part in the direction connecting the one end and the other end of the interlayer film part is measured. In the laminated glass set according to the present invention, a maximum value of distance Z is denoted by $Z_{max}$, a minimum value of distance Z is denoted by $Z_{min}$, and an average value of distance Z is denoted by $Z_{ave}$. It is preferred that the laminated glass set according to the present invention satisfy the following formula (3). That is, in the laminated glass set according to the present invention, it is preferred that a ratio of an absolute value of difference between $Z_{max}$ and $Z_{min}$, to $Z_{ave}$ be 0.1 or less. In this case, it is possible to further enhance the appearance designability.

$$(|Z_{max}-Z_{min}|)/Z_{ave} \leq 0.1 \quad \text{Formula (3)}$$

Specifically, the distance X, the distance Y, and the distance Z are measured in the following sequence of 1) to 2).

1) Measurement of Visible Light Transmittance

Using a spectrophotometer (for example, "U-4100" available from Hitachi High-Tech Science Corporation), visible light transmittance (Tv) of each laminated glass of a laminated glass set measurement is measured. Here, both ends of the interlayer film part in the direction that is perpendicular to both of the direction connecting the one end and the other end of the interlayer film part, and the thickness direction of the interlayer film part are respectively called a second one end and a second other end. Measurement of visible light transmittance is conducted for one laminated glass, in a region existing between the second one end and the position of 5 cm inwardly of the laminated glass from the second one end, and in a region existing between the second other end and the position of 5 cm inwardly of the laminated glass from the second other end. Hereinafter, these two regions are also described as measurement regions. Therefore, for one laminated glass, two measured values of visible light transmittance are obtained.

Specifically, a laminated glass is placed at a position 13 cm apart from the integrating sphere on the optical path between the light source and the integrating sphere, in parallel with the normal line of the light axis such that only the parallel light having penetrated the laminated glass is received by the integrating sphere, and spectral transmittance is measured. From the obtained spectral transmittance, visible light transmittance of the laminated glass is calculated. In the same manner, visible light transmittance is calculated for all the laminated glasses. In this manner, visible light transmittance of the laminated glass is measured along the direction connecting one end and the other end of the interlayer film part in the laminated glass, and for each laminated glass, a maximum value ($Tv_{max}$) and a minimum value ($Tv_{min}$) of visible light transmittance in each of the measurement regions are determined. Therefore, for one laminated glass, respectively two $Tv_{max}$ and $Tv_{min}$ are obtained. The measurement conditions include a scan speed: 300 nm/min, and a slit width: 8 nm, and other measurement conditions conform to JIS R3106:1998.

2) Measurement of Distance X, Distance Y, and Distance Z

From the measurement result of visible light transmittance, measurement regions of each laminated glass are segmented into the following regions. For one laminated glass, respectively two distances X, distance Y, and distances X are obtained.

Light color part: the region where Tv is more than ($0.1Tv_{min}+0.9Tv_{max}$), and $Tv_{max}$ or less Gradation part (also described as first gradation part for distinction from the later-described second gradation part): the region where Tv is ($0.9Tv_{min}+0.1Tv_{max}$) or more, and ($0.1Tv_{min}+0.9Tv_{max}$) or less, and Tv increases from one end side toward the other end side of the interlayer film part Second gradation part: the region where Tv is ($0.9Tv_{min}+0.1Tv_{max}$) or more, and ($0.1Tv_{min}+0.9Tv_{max}$) or less, and Tv increases from the other end side toward one end side of the interlayer film part Dark color part: the region where Tv is $Tv_{min}$ or more, and less than ($0.9Tv_{min}+0.1Tv_{max}$)

Colored part: the combined region of the dark color part and the gradation part

According to the above segmentation, distance X, distance Y, and distance Z are determined.

Distance X: the distance from one end of the interlayer film part to the tip of the colored part on the other end side of the interlayer film part More specifically, distance X is "the distance from one end of the interlayer film part to the boundary between the light color part and the gradation part".

Distance Y: the distance of the colored part in the direction connecting the one end and the other end of the interlayer film part Even when the gradation part forms both sides of the colored part (for example, when the gradation part, the dark color part and the gradation part align in this sequence), distance Y is the distance of the colored part including two gradation parts in the direction connecting one end and the other end of the interlayer film part.

Distance Z: the distance of gradation part in the direction connecting one end and the other end of the interlayer film part Distance X, distance Y, and distance Z of each measurement region of all the laminated glasses constituting the laminated glass set are determined. Therefore, distance X, distance Y, and distance Z are determined in the number twice the number of laminated glasses constituting the laminated glass set. From each obtained distance X, a maximum value $X_{max}$ of distance X, a minimum value $X_{min}$ of distance X, and an average value $X_{ave}$ of distance X are determined. From each obtained distance Y, a maximum value $Y_{max}$ of distance Y, a minimum value $Y_{min}$ of distance Y, and an average value $Y_{ave}$ of distance Y are determined. From each obtained distance Z, a maximum value $Z_{max}$ of distance Z, a minimum value $Z_{min}$ of distance Z, and an average value $Z_{ave}$ of distance Z are determined.

When the visible light transmittance, and distance X, distance Y and distance Z are measured, all the laminated glasses may be detached from the laminated glass structure, and the obtained laminated glasses may be subjected to measurement, or laminated glasses of the laminated glass set for use in production of the laminated glass structure may be subjected to measurement.

It is sometimes the case that the distance X and the distance Y coincide with each other in one laminated glass, for example, when the colored part reaches the one end of the interlayer film part.

The interlayer film part may include the colored part as a first colored part, and may include a second color having a gradation part where visible light transmittance increases from the other end side toward one end side in the widthwise direction of the interlayer film.

The interlayer film part may have a one-layer structure or a two or more-layer structure. The interlayer film part may have a two-layer structure, may have a three-layer structure, and may have a four-layer structure. When the interlayer film part has a two or more-layer structure, the whole interlayer film part need not have a two or more-layer structure, and the interlayer film part may partly have a one-layer structure in the direction perpendicular to the thickness direction of the interlayer film part.

It is preferred that the interlayer film part include a first resin layer and a second resin layer, and the first resin layer be arranged on a first surface side of the second resin layer. It is preferred that the second resin layer contain a coloring agent. It is preferred that the second resin layer form the colored part.

From the viewpoint of suppressing degradation in color tone, in the interlayer film part, it is preferred that the first resin layer be arranged on a second surface side opposite to the first surface side of the second resin layer. From the viewpoint of suppressing degradation in color tone, it is preferred that the second resin layer be embedded in the first resin layer. In this case, it is preferred that the second resin layer contain a coloring agent, and the second resin layer form the colored part. In this case, it is preferred that the second resin layer contain a coloring agent, and the second resin layer form the colored part.

From the viewpoint of suppressing degradation in color tone, in the interlayer film part, it is preferred that the first resin layer be arranged on the first surface side of the second resin layer, and the first resin layer be arranged on the second surface side of the second resin layer. From the viewpoint of suppressing degradation in color tone, it is preferred that the second resin layer be arranged between the first resin layers. In this case, it is preferred that the second resin layer contain a coloring agent, and the second resin layer form the colored part. In this case, it is preferred that the second resin layer contain a coloring agent, and the second resin layer form the colored part.

It is preferred that the interlayer film part include a first resin layer, a second resin layer and a third layer, the first resin layer be arranged on a first surface side of the second resin layer, and the third resin layer be arranged on a second surface side opposite to the first surface of the second resin layer. In this case, it is preferred that the second resin layer contain a coloring agent, and the second resin layer form the colored part. In this case, it is preferred that the second resin layer contain a coloring agent, and the second resin layer form the colored part.

It is also preferred that the interlayer film part include a first resin layer, a second resin layer, a third resin layer and a fourth resin layer, the second resin layer be embedded in the first resin layer, the third resin layer be arranged on a first surface side of the first resin layer, and the fourth resin layer be arranged on a surface opposite to the first resin layer of the third resin layer. In this case, it is preferred that the second resin layer contain a coloring agent, and the second resin layer form the colored part. In this case, it is preferred that the second resin layer contain a coloring agent, and the second resin layer form the colored part. In this case, the first resin layer and the third resin layer may be directly laminated, or a functional film or the like as will be described later may be arranged between the first resin layer and the third resin layer.

Further, it is also preferred that the interlayer film part include a first resin layer, a second resin layer, a third resin layer and a fourth resin layer, the second resin layer be embedded in the first resin layer, the fourth resin layer be embedded in the third resin layer, and the third resin layer and the fourth resin layer be arranged on a first surface side of the first resin layer. In this case, it is preferred that the second resin layer and the fourth resin layer contain a coloring agent, and the second resin layer and the fourth resin layer form the colored part. In this case, the first resin layer and the third resin layer may be directly laminated, or a functional film or the like as will be described later may be arranged between the first resin layer and the third resin layer.

The first resin layer, the second resin layer, the third resin layer and the fourth resin layer may have the same composition, or may have different compositions.

The third resin layer may be, but not limited to, a resin layer having excellent sound insulating property. The third resin layer may be a sound insulating layer. When the third resin layer is a sound insulating layer, it is possible to improve the sound insulating property and the appearance designability of the laminated glass.

When an interlayer film including the third resin layer is produced, the width of the colored part is more likely to vary in the obtained interlayer film. In order to reduce the variation in the width of the colored part, it is necessary to finely control the inlet pressure variation during production.

The interlayer film part can be obtained by cutting an interlayer film into a predetermined size.

It is preferred that the interlayer film has an MD direction and a TD direction. For example, the interlayer film is obtained by melt extrusion molding. The MD direction is a flow direction of an interlayer film at the time of producing the interlayer film. The TD direction is a direction orthogonal to the flow direction of an interlayer film at the time of producing the interlayer film and a direction orthogonal to the thickness direction of the interlayer film. The lengthwise direction of the interlayer film is usually the MD direction. The widthwise direction of the interlayer film is usually the TD direction.

The lengthwise direction and the widthwise direction of the interlayer film in the present specification mean the directions in the interlayer film before production of a laminated glass, and mean the directions in the interlayer film before cutting. After cutting of the interlayer film, the lengthwise direction of the interlayer film after cutting (cut piece) may be shorter than the widthwise direction of the interlayer film after cutting (cut piece). The lengthwise direction of the interlayer film before cutting may correspond to the lengthwise direction of the laminated glass, or may correspond to the widthwise direction of the laminated glass. The widthwise direction of the interlayer film before cutting may correspond to the widthwise direction of the laminated glass, or may correspond to the lengthwise direction of the laminated glass.

It is preferred that the direction connecting the one end and the other end of the interlayer film part correspond to the widthwise direction of the interlayer film.

It is preferred that the interlayer film have a length (L) of 30 m or more in the lengthwise direction. From the viewpoint of further enhancing the production efficiency of the interlayer film and the laminated glass, the length (L) is preferably 50 m or more, more preferably 100 m or more, still more preferably 150 m or more, further preferably 250 m or more, still further preferably 500 m or more, most preferably 1000 m or more. From the viewpoint of further enhancing the handleability of the interlayer film, the length (L) may be 2000 m or less, may be 1000 m or less, or may be 600 m or less.

In the interlayer film, the width (W) (widthwise dimension) is smaller than the length (L) (lengthwise dimension). From the viewpoint of further enhancing the handleability of the interlayer film, the width (W) is preferably 0.8 m or more, more preferably 1.0 m or more, further preferably 1.2 m or more, and is preferably 2.0 m or less, more preferably 1.8 m or less, further preferably 1.5 m or less.

From the viewpoint of further enhancing the handleability of the interlayer film, a ratio of the length (L) to the width (W) (length (L)/width (W)) is preferably 100 or more, more preferably 200 or more, further preferably 300 or more, and is preferably 2000 or less, more preferably 1000 or less, further preferably 500 or less.

From the viewpoint of further improving the appearance designability, a value of $(|X_{max}-X_{min}|)/X_{ave}$ is preferably 0.1 or less, more preferably 0.09 or less, still more preferably 0.07 or less, further preferably 0.05 or less, especially preferably 0.03 or less, most preferably 0.01 or less.

From the viewpoint of further improving the appearance designability, a value of $|X_{max}-X_{min}|$ is preferably 80 mm or less, more preferably 16 mm or less, further preferably 10 mm or less.

The $X_{min}$ is preferably 0.1 m or more, more preferably 0.3 m or more, still more preferably 0.6 m or more, further preferably 0.8 m or more, especially preferably 1.0 m or more, most preferably 1.5 m or more. When the $X_{min}$ is the above lower limit or more, it is possible to ensure the privacy protectability with a large area. When the colored part is long, the length of the colored part is more likely to vary. However, in the present invention, since the variation in length of the colored part is controlled with high accuracy, it is possible to enhance the appearance designability of the laminated glass and the laminated glass set.

A ratio of $X_{min}$ to the width (W) of the interlayer film part ($X_{min}$/width of interlayer film part (W)) may be 0.9 or less, may be 0.8 or less, may be 0.7 or less, may be 0.6 or less, may be 0.5 or less, may be 0.3 or less, or may be 0.1 or less.

From the viewpoint of further improving the appearance designability, a value of $(|Y_{max}-Y_{min}|)/Y_{ave}$ is preferably 0.1 or less, more preferably 0.09 or less, still more preferably 0.07 or less, further preferably 0.05 or less, especially preferably 0.03 or less, most preferably 0.01 or less.

From the viewpoint of further improving the appearance designability, a value of $|Y_{max}-Y_{min}|$ is preferably 80 mm or less, more preferably 16 mm or less, further preferably 10 mm or less.

The $Y_{min}$ is preferably 0.1 m or more, more preferably 0.3 m or more, still more preferably 0.6 m or more, further preferably 0.8 m or more, especially preferably 1.0 m or more, most preferably 1.5 m or more. When the $Y_{min}$ is the above lower limit or more, it is possible to ensure the privacy protectability with a large area. When the colored part is long, the length of the colored part is more likely to vary. However, in the present invention, since the variation in length of the colored part is controlled with high accuracy, it is possible to enhance the appearance designability of the laminated glass set.

A ratio of $Y_{min}$ to the width (W) of the interlayer film part ($Y_{min}$/width of interlayer film part (W)) may be 0.9 or less, may be 0.8 or less, may be 0.7 or less, may be 0.6 or less, may be 0.5 or less, may be 0.3 or less, or may be 0.1 or less.

From the viewpoint of further improving the appearance designability, a value of $(|Z_{max}-Z_{min}|)/Z_{ave}$ is preferably 0.1 or less, more preferably 0.07 or less, further preferably 0.05 or less, especially preferably 0.02 or less, most preferably 0.01 or less.

The $Z_{min}$ is preferably 0.001 m or more, more preferably 0.01 m or more, still more preferably 0.03 m or more, further preferably 0.1 m or more, still further preferably 0.3 m or more, especially preferably 0.5 m or more, most preferably 1 m or more. When the $Z_{min}$ is the above lower limit or more, a gradation pattern is formed in a large area, and the appearance designability can be further improved.

A ratio of $Z_{min}$ to the width (W) of the interlayer film part ($Z_{min}$/width of interlayer film (W)) may be 0.9 or less, may be 0.5 or less, may be 0.3 or less, may be 0.1 or less, or may be 0.05 or less.

As a method for setting the value of $(|X_{max}-X_{min}|)/X_{ave}$, the value of $(|Y_{max}-Y_{min}|)/Y_{ave}$, and the value of $(|Z_{max}-Z_{min}|)/Z_{ave}$ fall within the aforementioned preferred ranges, a method of controlling the extrusion conditions with high accuracy in extrusion molding the interlayer film is recited.

In a conventional method for producing an interlayer film, the extrusion conditions are controlled with somewhat high accuracy. For example, in a conventional method for producing an interlayer film, variation in the widthwise direction of the colored part caused by oscillation of the extrusion pressure in a short period is detected during extrusion from the mold. Therefore, even with a conventional method for producing an interlayer film, it is possible to control the variation in the width of the colored part in a short period to some extent. The present inventors found that in a conventional method for producing an interlayer film, it is impossible to detect the variation in the widthwise direction of the colored part caused by oscillation of the extrusion pressure in a long period, and as a result, the variation in the width of the colored part in a long period is not controlled.

As a method for controlling the extrusion conditions with high accuracy in extrusion molding the interlayer film according to the present invention, specifically, the following method can be recited.

A first resin composition mainly for forming a light color part is prepared. Also, a first extruder for kneading and extruding the first resin composition is prepared. Also, a second resin composition mainly for forming a colored part and containing a coloring agent is prepared. Also, a second extruder for kneading and extruding the second resin composition is prepared.

It is preferred that the method for producing an interlayer film include a step of converging and laminating the first resin composition extruded from the first extruder and the second resin composition extruded from the second extruder by means of a feed block, and molding the compositions by extruding from the die.

Since oscillation in the extrusion pressure at the time of confluence and lamination causes variation in the flow amount from each extruder at the time of confluence, the thickness and the width of the first resin layer formed of the first resin composition, and the thickness and the width of the second resin layer formed of the second resin composition vary, resulting that the width of the colored part in the interlayer film extruded from the die tends to vary. In particular, variation in the extrusion amount of the first resin composition tends to cause variation in the width of the colored part. Therefore, it is important to suppress the oscillation in the extrusion pressure.

The present inventors focused on suppressing the variation in the extrusion pressure in a long period, that has not been required heretofore. As a result of diligent efforts, the present inventors found that suppressing the variation in extrusion of the first resin composition is especially effective, and as a measure, by suppressing the variation in the inlet pressure, measured with a pressure gauge installed in the inlet of the gear pump, in a much longer period than ever before, it is possible to suppress the variation in the width of the colored part in a long period. Specifically, the present inventors found that by controlling the difference between the maximum value and the minimum value of the inlet pressure for 180 seconds to a certain value or less, it is possible to suppress the variation in the width of the colored part due to the variation in inlet pressure of a long term than ever before, and it is possible to produce the interlayer film according to the present invention. The present inventors also found that the variation in the width of the colored part can be suppressed more effectively by installing two gear pumps in series, and further reducing the variation in inlet pressure of the gear pump installed on the downstream side.

The gradation part can be prepared in the following method and the like. Method of decreasing the thickness of the second resin layer from one end side toward the other end side of the interlayer film part. Method of decreasing the concentration of the coloring agent in the second resin layer from the one end side toward the other end side of the interlayer film part.

The gradation part is, for example, a part where the thickness of the second resin layer decreases from the one end side toward the other end side of the interlayer film part, or a part where the concentration of the coloring agent in the second resin layer decreases from the one end side toward the other end side of the interlayer film part. From the viewpoint of further improving the gradation state, it is preferred that the gradation part be a part where the thickness of the second resin layer decreases from the one end side toward the other end side of the interlayer film part.

It is preferred that the colored part reach the one end of the interlayer film part. That is, it is preferred that a tip of the colored part on the one end side of the interlayer film part reach the one end of the interlayer film part. It is to be noted that the colored part need not reach the one end of the interlayer film part. The colored part, which fails to reach the other end of the interlayer film part, is capable of moderately increasing the visible light transmittance of the laminated glass, and increasing the visibility through the laminated glass on the other end side of the interlayer film part.

The colored part may have the dark color part from the one end side toward the other end side of the interlayer film part. The dark color part is located closer to the one end of the interlayer film part than the gradation part. It is preferred that visible light transmittance of the dark color part be uniform. It is preferred that the colored part have a dark color part where visible light transmittance is uniform from the one end side toward the other end side of the interlayer film part.

The part where visible light transmittance increases from the one end side toward the other end side of the interlayer film part is called a first gradation part. The colored part may have a second gradation part where visible light transmittance increases from the other end side toward the one end side of the interlayer film part. The second gradation part is located closer to the one end of the interlayer film part than the first gradation part.

The colored part may have a dark color part from the one end side toward the other end side of the interlayer film part between the first gradation part and the second gradation part.

The interlayer film part may have a light color part. The light color part may contain a coloring agent, or need not contain a coloring agent. The light color part may be a part of the first resin layer, or may be a part of the second resin layer containing a coloring agent.

The laminated glass preferably has a part having a visible light transmittance of 10% or less, more preferably has a part having a visible light transmittance of 5% or less, and further preferably has a part having a visible light transmittance of 1% or less. The part where visible light transmittance is the above upper limit or less may be the dark color part, or may be part of the gradation part. When the part having a visible light transmittance of the above upper limit or less is provided, it is possible to favorably provide the laminated glass set with privacy protectability.

The laminated glass preferably has a part having a visible light transmittance of 20% or more, more preferably has a part having a visible light transmittance of 40% or more, further preferably has a part having a visible light transmittance of 60% or more, and most preferably has a part having a visible light transmittance of 70% or more. The part having a visible light transmittance of the above lower limit or more may be the dark color part, or may be the light color part, or may be a part of the gradation part. When the part having a visible light transmittance of the above lower limit or more is provided, it is possible to favorably provide the laminated glass set with transparency.

The visible light transmittance means visible light transmittance of the laminated glass at a wavelength of 380 nm to 780 nm. The visible light transmittance can be measured using a spectrophotometer ("U-4100" available from Hitachi High-Tech Science Corporation) in conformity with JIS R3106:1998.

From the viewpoint of further improving the appearance designability, when the interlayer film part is planarly viewed, the area of the part where the colored part exists in 100% of the total area of the interlayer film part is preferably 5% or more, more preferably 10% or more, still more preferably 15% or more, further preferably 20% or more. When the interlayer film part is planarly viewed, the area of the part where the colored part exists in 100% of the total area of the interlayer film part may be 30% or more, may be 40% or more, or may be 50% or more. When the interlayer film part is planarly viewed, the area of the part where the colored part exists in 100% of the total area of the interlayer film part may be 90% or less, may be 80% or less, may be 70% or less, may be 60% or less, or may be 50% or less. The area of the part where the colored part exists may be an average value of proportions of distance $Y$ of the colored part to the distance from one end to the other end of the interlayer film part determined in two measurement regions of the laminated glass. That is, area of part where colored part exist in measurement region (%)=(distance $Y$ of colored part)/(distance from one end to the other end of interlayer film)×100 may be determined in two measurement regions, and an average value thereof may be regarded as an area of the part where the colored part exists in 100% of the total area of the interlayer film part.

From the viewpoint of further improving the appearance designability, when the laminated glass is planarly viewed, the area of the part having a visible light transmittance of 60% or less in 100% of the total area of the laminated glass is preferably 5% or more, more preferably 10% or more, still more preferably 15% or more, further preferably 20% or more. When the laminated glass is planarly viewed, the area of the part having a visible light transmittance of 60% or less in 100% of the total area of the laminated glass may be 30% or more, may be 40% or more, or may be 50% or more. When the laminated glass is planarly viewed, the area of the part having a visible light transmittance of 60% or less in 100% of the total area of the laminated glass may be 90% or less, may be 80% or less, may be 70% or less, may be 60% or less, or may be 50% or less. The area of the part having a visible light transmittance of 60% or less may be an average value of proportions of the distance of the part having a visible light transmittance of 60% or less to the distance from one end to the other end of the interlayer film part determined in two measurement regions of the laminated glass. That is, area of part having visible light transmittance of 60% or less in measurement region (%)=(distance of region having visible light transmittance of 60% or less)/(distance from one end to the other end of interlayer film)×100 may be determined in two measurement regions, and an average value thereof may be regarded as an area of the part having a visible light transmittance of 60% or less in 100% of the total area of the interlayer film part.

From the viewpoint of further improving the appearance designability, when the laminated glass is planarly viewed, the area of the part having a visible light transmittance of 50% or less in 100% of the total area of the laminated glass is preferably 5% or more, more preferably 10% or more, still more preferably 15% or more, further preferably 20% or more. When the laminated glass is planarly viewed, the area of the part having a visible light transmittance of 60% or less in 100% of the total area of the laminated glass may be 30% or more, may be 40% or more, or may be 50% or more. When the laminated glass is planarly viewed, the area of the part having a visible light transmittance of 50% or less in 100% of the total area of the laminated glass may be 90% or less, may be 80% or less, may be 70% or less, may be 60% or less, or may be 50% or less.

From the viewpoint of further improving the appearance designability, when the laminated glass is planarly viewed, the area of the part having a visible light transmittance of 40% or less in 100% of the total area of the laminated glass is preferably 5% or more, more preferably 10% or more, still more preferably 15% or more, further preferably 20% or more. When the laminated glass is planarly viewed, the area of the part having a visible light transmittance of 60% or less in 100% of the total area of the laminated glass may be 30% or more, may be 40% or more, or may be 50% or more. When the laminated glass is planarly viewed, the area of the part having a visible light transmittance of 40% or less in 100% of the total area of the laminated glass may be 90% or less, may be 80% or less, may be 70% or less, may be 60% or less, or may be 50% or less. The area of the part having a visible light transmittance of 50% or less and the area of the part having a visible light transmittance of 40% or less may be determined from the distance of the region where visible light transmittance in each measurement region is 50% or less and the distance of the region where visible light transmittance is 40% or less, and the distance from one end to the other end of the interlayer film, as with the area of the part having a visible light transmittance of 60% or less.

The laminated glass can be used for partitions, automobiles, railway vehicles, aircraft, ships, buildings, and the like.

The interlayer film part can be formed by using an interlayer film. By a cut piece obtained by cutting one interlayer film in the lengthwise direction, the interlayer film part in the laminated glass can be formed. By cutting one interlayer film in the lengthwise direction, it is possible to obtain a plurality of cut pieces (for example, cut piece (1), cut piece (2), cut piece (3), . . . ). It is preferred that the interlayer film parts (e.g., interlayer film part (1), interlayer film part (2), interlayer film part (3), . . . ) in the plurality of laminated glasses (e.g., laminated glass (1), laminated glass (2), laminated glass (3), . . . ) be respectively configured by the plurality of cut pieces (e.g., cut piece (1), cut piece (2), cut piece (3), . . . ).

When one interlayer film is cut in the lengthwise direction, the cutting interval is preferably 0.3 m or more, more preferably 0.5 m or more, further preferably 1.0 m or more, especially preferably 1.5 m or more, and is preferably 10 m or less, more preferably 5 m or less, further preferably 3 m or less. When the interval is the above lower limit or more, it is possible to obtain a laminated glass having a large area. When the interval is the above upper limit or less, it is possible to reduce damage of the laminated glass.

The dimension of the interlayer film part in the laminated glass in the direction corresponding to the lengthwise direction of the interlayer film before cutting is preferably 0.1 m or more, more preferably 0.5 m or more, further preferably 1.5 m or more, especially preferably 2.0 m or more, and is preferably 10 m or less, more preferably 5 m or less, further preferably 3.5 m or less. When the dimension is the above lower limit or more, it is possible to obtain a laminated glass having a large area. When the dimension is the above upper limit or less, it is possible to reduce damage of the laminated glass.

The laminated glass set can be obtained through the following steps. A step of cutting one interlayer film in the lengthwise direction to obtain a plurality of cut pieces. A step of preparing a plurality of first lamination glass members, and a plurality of second lamination glass members for obtaining a plurality of laminated glasses, and arranging each of the cut pieces as an interlayer film part between each of the first lamination glass members and each of the second lamination glass members, to obtain a plurality of laminated glasses.

It is preferred that the method for producing a laminated glass set include the following steps.

In the laminated glass set, the number of laminated glasses is preferably 2 or more, more preferably 3 or more, still more preferably 4 or more, further preferably 5 or more. In this case, even when the number of laminated glasses is large, the appearance designability of the entire laminated glass can be enhanced. In the above laminated glass set, the number of laminated glasses may be 500 or less, may be 300 or less, may be 100 or less, or may be 50 or less.

The laminated glass set is suitably used for obtaining a laminated glass structure.

The laminated glass structure includes the laminated glass set (a plurality of laminated glasses), and a connecting member that connects the plurality of laminated glasses in the laminated glass set. Each of the plurality of laminated glasses includes a first lamination glass member, a second lamination glass member, and an interlayer film part arranged between the first lamination glass member and the second lamination glass member. From the viewpoint of enhancing the production efficiency of the laminated glass set, it is preferred that respective interlayer film parts in the plurality of laminated glasses be configured by the plurality of cut pieces obtained by cutting one interlayer film in the lengthwise direction.

In the laminated glass structure, it is preferred that the plurality of laminated glasses are arranged in line so that the colored parts in the plurality of laminated glasses align.

In the laminated glass structure, the number of laminated glasses is preferably 2 or more, more preferably 3 or more, still more preferably 4 or more, further preferably 5 or more. In this case, even when the number of laminated glasses is large, the appearance designability of the entire laminated glass can be enhanced. In the above laminated glass structure, the number of laminated glasses may be 500 or less, may be 300 or less, may be 100 or less, or may be 50 or less.

Hereinafter, specific embodiments of the present invention will be described with reference to the drawings. The size and dimension of the interlayer film, the roll body and the laminated glass in the drawings described below are appropriately changed from the actual size and shape for convenience of illustration. In the drawings described below, different points are replaceable. In the drawings described below, the part that may have the same configuration is sometimes denoted by the same reference symbol.

FIG. 1 is a sectional view schematically showing a laminated glass in a laminated glass set in accordance with a first embodiment of the present invention. FIG. 2 is a sectional view schematically showing an interlayer film for use in obtaining the laminated glass shown in FIG. 1.

A laminated glass 31 shown in FIG. 1 includes a cut piece obtained by cutting an interlayer film 11 shown in FIG. 2, as an interlayer film part 11P.

The laminated glass 31 includes a first lamination glass member 21, a second lamination glass member 22, and the interlayer film part 11P. The interlayer film part 11P is arranged between the first lamination glass member 21 and the second lamination glass member 22. The first lamination glass member 21 is arranged on a first surface side of the interlayer film part 11P to be layered thereon. The second lamination glass member 22 is arranged on a second surface side opposite to the first surface of the interlayer film part 11P to be layered thereon.

The interlayer film part 11P has one end 11a and the other end 11b at the opposite side of the one end 11a.

The interlayer film part 11P includes a first resin layer 1 and a second resin layer 2 containing a coloring agent. The second resin layer 2 reaches the one end 11a of the interlayer film part 11P. The one end 11a part of the interlayer film part 11P is configured by the second resin layer 2 and the first resin layer 1. The second resin layer 2 forms a colored part.

On both surface sides of the second resin layer 2, the first resin layer 1 is arranged. The second resin layer 2 is embedded in the first resin layer 1. The first resin layer 1 is a surface layer of the interlayer film part 11P. The second resin layer 2 is an intermediate layer of the interlayer film part 11P.

The second resin layer 2 has a gradation part 2X where visible light transmittance increases from the one end 11a side toward the other end 11b side of the interlayer film part 11P. The second resin layer 2 has a dark color part 2Y on the one end 11a side of the interlayer film part 11P. The second resin layer 2 reaches the one end 11a of the interlayer film part 11P at the dark color part 2Y. The gradation part 2X is a part where the thickness of the second resin layer 2 decreases from the one end 11a side toward the other end 11b side of the interlayer film part 11P. The dark color part 2Y is a part where the thickness of the second resin layer 2 is uniform. In the interlayer film part 11P, the colored part is configured by the gradation part 2X and the dark color part 2Y. The gradation part 2X forms a tip of the colored part on the other end 11b side of the interlayer film part 11P.

FIG. 1 shows only one laminated glass 31. By cutting the interlayer film 11 below, a plurality of cut pieces can be obtained. Using the plurality of cut pieces as the interlayer film parts 11P, a plurality of laminated glasses 31, namely a laminated glass set can be obtained.

In a set of laminated glasses 31, the distance X and the distance Y are the same value in one laminated glass 31.

FIG. 2 is a sectional view in the widthwise direction of the interlayer film 11. The right and left direction of FIG. 2 is the widthwise direction of the interlayer film 11. The fore-and-aft direction of FIG. 2 is the lengthwise direction of the interlayer film 11.

The interlayer film 11 has one end 11a on one side in the widthwise direction, and the other end 11b on the other side in the widthwise direction.

The interlayer film 11 includes the first resin layer 1 and the second resin layer 2 as with the interlayer film part 11P. The colored part has a gradation part 2X and a dark color part 2Y.

FIG. 3 is a perspective view schematically showing a roll body prepared by winding the interlayer film shown in FIG. 2.

As shown in FIG. 3, the interlayer film 11 may be wound to be formed into a roll body 51 of the interlayer film 11.

The roll body 51 shown in FIG. 3 includes a winding core 61 and the interlayer film 11. The interlayer film 11 is wound around an outer periphery of the winding core 61. The interlayer film 11 is wound around the outer periphery of the winding core 61 from the other end side in the lengthwise direction of the interlayer film 11.

FIG. 4 is a perspective view schematically showing a partially developed state of a roll body prepared by winding the interlayer film shown in FIG. 2.

FIG. 4 schematically shows the colored state. The darker the color tone, the lower the visible light transmittance. The distance X, the distance Y and the distance Z in the laminated glass 31 may correspond to distance X, distance Y and distance Z in FIG. 4.

FIG. 5 is a sectional view schematically showing a laminated glass in a laminated glass set in accordance with a second embodiment of the present invention. FIG. 6 is a sectional view schematically showing an interlayer film for use in obtaining the laminated glass shown in FIG. 5.

FIG. 5 is a sectional view of a laminated glass 31A. The right and left direction of FIG. 5 is the widthwise direction of the laminated glass 31A. The fore-and-aft direction of FIG. 5 is the lengthwise direction of the laminated glass 31A.

The laminated glass 31A includes a cut piece obtained by cutting an interlayer film 11A shown in FIG. 6, as an interlayer film part 11AP.

The laminated glass 31A includes the first lamination glass member 21, the second lamination glass member 22, and the interlayer film part 11AP. The interlayer film part 11AP is arranged between the first lamination glass member 21 and the second lamination glass member 22. The first lamination glass member 21 is arranged on a first surface side of the interlayer film part 11AP to be layered thereon. The second lamination glass member 22 is arranged on a second surface side opposite to the first surface of the interlayer film part 11AP to be layered thereon.

The interlayer film part 11AP has one end 11Aa and the other end 11Ab at the opposite side of the one end 11Aa.

The interlayer film part 11AP includes a first resin layer 1A and a second resin layer 2A containing a coloring agent. The second resin layer 2A does not reach the one end 11Aa of the interlayer film part 11AP. The one end 11Aa part of the interlayer film part 11AP is configured only by the first resin layer 1A. The second resin layer 2A forms a colored part.

On both surface sides of the second resin layer 2A, the first resin layer 1A is arranged. The second resin layer 2A is embedded in the first resin layer 1A. The first resin layer 1A is a surface layer of the interlayer film part 11AP. The second resin layer 2A is an intermediate layer of the interlayer film part 11AP.

The second resin layer 2A has a gradation part 2AX where visible light transmittance increases from the one end 11Aa side toward the other end 11Ab side of the interlayer film part 11AP. The second resin layer 2A has a dark color part 2AY on the one end 11Aa side of the interlayer film part 11AP. The gradation part 2AX is a part where the thickness of the second resin layer 2A decreases from the one end 11Aa side toward the other end 11Ab side of the interlayer film part 11AP. The dark color part 2AY is a part where the thickness of the second resin layer 2A is uniform. In the interlayer film part 11AP, the colored part is configured by the gradation part 2AX and the dark color part 2AY. The gradation part 2AX forms a tip of the colored part on the other end 11Ab side of the interlayer film part 11AP.

FIG. 5 shows only one laminated glass 31A. By cutting the interlayer film 11A below, a plurality of cut pieces can be obtained. Using the plurality of cut pieces as the interlayer film parts 11AP, a plurality of laminated glasses 31A, namely a laminated glass set can be obtained.

FIG. 6 is a sectional view in the widthwise direction of the interlayer film 11A. The right and left direction of FIG. 6 is the widthwise direction of the interlayer film 11A. The fore-and-aft direction of FIG. 6 is the lengthwise direction of the interlayer film 11A.

The interlayer film 11A shown in FIG. 6 has one end 11Aa on one side in the widthwise direction, and the other end 11Ab on the other side in the widthwise direction.

The interlayer film 11A includes the first resin layer 1A and the second resin layer 2A as with the interlayer film part 11AP. The colored part has the gradation part 2AX and the dark color part 2AY.

FIG. 7 is a perspective view schematically showing a roll body prepared by winding the interlayer film shown in FIG. 6.

As shown in FIG. 7, the interlayer film 11A may be wound to be formed into a roll body 51A of the interlayer film 11A.

The roll body 51A shown in FIG. 7 includes the winding core 61 and the interlayer film 11A. The interlayer film 11A is wound around an outer periphery of the winding core 61. The interlayer film 11A is wound around the outer periphery of the winding core 61 from the other end side in the lengthwise direction of the interlayer film 11A.

FIG. 8 is a perspective view schematically showing a partially developed state of a roll body prepared by winding the interlayer film shown in FIG. 6.

FIG. 8 schematically shows the colored state. The darker the color tone, the lower the visible light transmittance. The distance X, the distance Y and the distance Z in the laminated glass 31A may correspond to distance X, distance Y and distance Z in FIG. 8.

FIG. 9 is a sectional view schematically showing a laminated glass in a laminated glass set in accordance with a third embodiment of the present invention. FIG. 10 is a sectional view schematically showing an interlayer film for use in obtaining the laminated glass shown in FIG. 9.

A laminated glass 31B shown in FIG. 9 includes a cut piece obtained by cutting an interlayer film 11B shown in FIG. 10, as an interlayer film part 11BP.

The laminated glass 31B includes the first lamination glass member 21, the second lamination glass member 22, and the interlayer film part 11BP. The interlayer film part 11BP is arranged between the first lamination glass member 21 and the second lamination glass member 22. The first lamination glass member 21 is arranged on a first surface side of the interlayer film part 11BP to be layered thereon. The second lamination glass member 22 is arranged on a second surface side opposite to the first surface of the interlayer film part 11BP to be layered thereon.

The interlayer film part 11BP has one end 11Ba and the other end 11Bb at the opposite side of the one end 11Ba.

The interlayer film part 11BP includes a first resin layer 1B and a second resin layer 2B containing a coloring agent. The second resin layer 2B does not reach the one end 11Ba of the interlayer film part 11BP. The one end 11Ba part of the interlayer film part 11BP is configured only by the first resin layer 1B. The second resin layer 2B forms a colored part.

On both surface sides of the second resin layer 2B, the first resin layer 1B is arranged. The second resin layer 2B is embedded in the first resin layer 1B. The first resin layer 1B is a surface layer of the interlayer film part 11BP. The second resin layer 2B is an intermediate layer of the interlayer film part 11BP.

The second resin layer 2B has a first gradation part 2BX where visible light transmittance increases from the one end 11Ba side toward the other end 11Bb side of the interlayer film part 11BP. The first gradation part 2BX forms a tip of the colored part on the other end 11Bb side of the interlayer film part 11BP. The second resin layer 2B has a second gradation part 2BZ where visible light transmittance increases from the other end 11Bb side toward the one end 11Ba side of the interlayer film part 11BP, on the one end 11Ba side of the interlayer film part 11BP. The first gradation part 2BX is a part where the thickness of the second resin layer 2B decreases from the one end 11Ba side toward the other end 11Bb side of the interlayer film part 11BP. The second gradation part 2BZ is a part where the thickness of the second resin layer 2B decreases from the other end 11Bb side toward the one end 11Ba side of the interlayer film part 11BP.

FIG. 9 shows only one laminated glass 31B. By cutting the interlayer film 11B below, a plurality of cut pieces can be obtained. Using the plurality of cut pieces as the interlayer film parts 11BP, a plurality of laminated glasses 31B, namely a laminated glass set can be obtained.

FIG. 10 is a sectional view in the widthwise direction of the interlayer film 11B. The right and left direction of FIG. 10 is the widthwise direction of the interlayer film 11B. The fore-and-aft direction of FIG. 10 is the lengthwise direction of the interlayer film 11B.

The interlayer film 11B has one end 11Ba on one side in the widthwise direction, and the other end 11Bb on the other side in the widthwise direction.

The interlayer film 11B includes the first resin layer 1B and the second resin layer 2B as with the interlayer film part 11BP. The second resin layer 2B has the first gradation part 2BX, and the second gradation part 2BZ.

FIG. 11 is a perspective view schematically showing a roll body prepared by winding the interlayer film shown in FIG. 10.

As shown in FIG. 11, the interlayer film 11B may be wound to be formed into a roll body 51B of the interlayer film 11B.

The roll body 51B shown in FIG. 11 includes the winding core 61 and the interlayer film 11B. The interlayer film 11B is wound around an outer periphery of the winding core 61. The interlayer film 11B is wound around the outer periphery of the winding core 61 from the other end side in the lengthwise direction of the interlayer film 11B.

FIG. 12 is a perspective view schematically showing a partially developed state of a roll body prepared by winding the interlayer film shown in FIG. 10.

FIG. 12 schematically shows the colored state. The darker the color tone, the lower the visible light transmittance. The distance X, the distance Y and the distance Z in the laminated glass 31B may correspond to distance X, distance Y and distance Z in FIG. 12.

In the laminated glass 31B, the distance X and the distance Y are different values. It is to be noted that the width of the second gradation part 2BZ is not included in the distance Z because the second gradation part 2BZ is not a part where visible light transmittance increases from the one end 11Ba side toward the other end 11Bb side of the interlayer film part 11BP (first gradation part 2BX).

FIG. 13 is a sectional view schematically showing a laminated glass in a laminated glass set in accordance with a fourth embodiment of the present invention. FIG. 14 is a sectional view schematically showing an interlayer film for use in obtaining the laminated glass shown in FIG. 13.

In FIG. 13 and FIG. 14, a coloring agent Q is schematically shown, and abundance of the coloring agent Q is schematically shown. When the coloring agent is particulate, the actual size of the coloring agent is significantly smaller than the size shown in FIG. 13 and FIG. 14. In the sectional views of laminated glasses and interlayer films other than FIG. 13 and FIG. 14, illustration of a coloring agent is omitted.

A laminated glass 31C shown in FIG. 13 includes a cut piece obtained by cutting an interlayer film 11C shown in FIG. 14, as an interlayer film part 11CP.

The laminated glass 31C includes the first lamination glass member 21, the second lamination glass member 22, and the interlayer film part 11CP. The interlayer film part 11CP is arranged between the first lamination glass member 21 and the second lamination glass member 22. The first lamination glass member 21 is arranged on a first surface side of the interlayer film part 11CP to be layered thereon. The second lamination glass member 22 is arranged on a second surface side opposite to the first surface of the interlayer film part 11CP to be layered thereon.

The interlayer film part 11CP has one end 11Ca and the other end 11Cb at the opposite side of the one end 11Ca.

The interlayer film part 11CP includes a first resin layer 1C and a second resin layer 2C containing a coloring agent Q. The second resin layer 2C reaches the one end 11Ca of the interlayer film part 11CP. The one end 11Ca part of the interlayer film part 11CP is configured by the second resin layer 2C and the first resin layer 1C. The part containing the coloring agent Q in the second resin layer 2C forms a colored part.

The second resin layer 2C has a gradation part 2CX. The second resin layer 2C has a dark color part 2CY on the one end 11Ca side of the interlayer film part 11CP. The second resin layer 2C reaches the one end 11Ca of the interlayer film part 11CP at the dark color part 2CY. The gradation part 2CX is a part where the concentration of the coloring agent Q decreases from the one end 11Ca side toward the other end 11Cb side of the interlayer film part 11CP. The dark color part 2CY is a part where the concentration of the coloring agent Q is uniform. In the interlayer film part 11CP, the colored part is configured by the gradation part 2CX and the dark color part 2CY. The gradation part 2CX forms a tip of the colored part on the other end 11Cb side of the interlayer film part 11CP.

The one end 11Ca side of the interlayer film part 11CP is configured by three layers: the first resin layer 1C, the second resin layer 2C and the first resin layer 1C. On both surface sides of the second resin layer 2C, the first resin layer 1C is arranged. The second resin layer 2C is embedded in the first resin layer 1C. On the one end 11Ca side of the interlayer film part 11CP, the two first resin layers 1C are surface layers of the interlayer film part 11CP. On the one end 11Ca side of the interlayer film part 11CP, the one second resin layer 2C is an intermediate layer of the interlayer film part 11CP.

The other end 11Cb side of the interlayer film part 11CP is configured by three layers: the first resin layer 1C, the second resin layer 2C, and the first resin layer 1C. On the other end 11Cb side of the interlayer film part 11CP, the two first resin layers 1C are surface layers of the interlayer film part 11CP. On the other end 11Cb side of the interlayer film part 11CP, the one first resin layer 1C is an intermediate layer of the interlayer film part 11CP.

The second resin layer 2C which is an intermediate layer, and the first resin layer 1C which is a surface layer are continuous.

As with the interlayer film part 11CP, the gradation part may be formed by the variation in concentration of the coloring agent.

FIG. 13 shows only one laminated glass 31C. By cutting the interlayer film 11C below, a plurality of cut pieces can be obtained. Using the plurality of cut pieces as the interlayer film parts 11CP, a plurality of laminated glasses 31C, namely a laminated glass set can be obtained.

FIG. 14 is a sectional view in the widthwise direction of the interlayer film 11C. The right and left direction of FIG. 14 is the widthwise direction of the interlayer film 11C. The fore-and-aft direction of FIG. 14 is the lengthwise direction of the interlayer film 11C.

The interlayer film 11C has one end 11Ca on one side in the widthwise direction, and the other end 11Cb on the other side in the widthwise direction.

The interlayer film 11C includes the first resin layer 1C and the second resin layer 2C as with the interlayer film part 11CP. The colored part has the gradation part 2CX and the dark color part 2CY.

The interlayer film 11C may also be a roll body.

FIG. 15 is a sectional view schematically showing a laminated glass in a laminated glass set in accordance with a fifth embodiment of the present invention. FIG. 16 is a sectional view schematically showing an interlayer film for use in obtaining the laminated glass shown in FIG. 15.

A laminated glass 31D shown in FIG. 15 includes a cut piece obtained by cutting an interlayer film 11D shown in FIG. 16, as an interlayer film part 11DP.

The laminated glass 31D includes the first lamination glass member 21, the second lamination glass member 22, and the interlayer film part 11DP. The interlayer film part 11DP is arranged between the first lamination glass member 21 and the second lamination glass member 22. The first lamination glass member 21 is arranged on a first surface side of the interlayer film part 11DP to be layered thereon. The second lamination glass member 22 is arranged on a second surface side opposite to the first surface of the interlayer film part 11DP to be layered thereon.

The interlayer film part 11DP has one end 11Da and the other end 11Db at the opposite side of the one end 11Da.

The interlayer film part 11DP includes a first resin layer 1D and a second resin layer 2D containing a coloring agent. The second resin layer 2D reaches the one end 11Da of the interlayer film part 11P. The one end 11Da part of the interlayer film part 11DP is configured by the second resin layer 2 and the first resin layer 1D. The second resin layer 2D forms a colored part.

On either surface side of the second resin layer 2D, the first resin layer 1D is arranged. The second resin layer 2D is not embedded in the first resin layer 1D. The first resin layer 1D is a surface layer of the interlayer film part 11DP. The second resin layer 2D is a surface layer of the interlayer film part 11DP.

The second resin layer 2D has a gradation part 2DX where visible light transmittance increases from the one end 11Da side toward the other end 11Db side of the interlayer film part 11DP. The second resin layer 2D has a dark color part 2DY on the one end 11Da side of the interlayer film part 11DP. The second resin layer 2D reaches the one end 11Da of the interlayer film part 11DP at the dark color part 2DY. The gradation part 2DX is a part where the thickness of the second resin layer 2D decreases from the one end 11Da side toward the other end 11Db side of the interlayer film part 11DP. The dark color part 2DY is a part where the thickness of the second resin layer 2D is uniform. In the interlayer film part 11DP, the colored part is configured by the gradation part 2DX and the dark color part 2DY. The gradation part 2DX forms a tip of the colored part on the other end 11Db side of the interlayer film part 11DP.

As with the interlayer film part 11DP, the second resin layer need not be embedded in the first resin layer, and the second resin layer may be a surface layer.

FIG. 15 shows only one laminated glass 31D. By cutting the interlayer film 11D below, a plurality of cut pieces can be obtained. Using the plurality of cut pieces as the interlayer film parts 11DP, a plurality of laminated glasses 31D, namely a laminated glass set can be obtained.

FIG. 16 is a sectional view in the widthwise direction of the interlayer film 11D. The right and left direction of FIG. 16 is the widthwise direction of the interlayer film 11D. The fore-and-aft direction of FIG. 16 is the lengthwise direction of the interlayer film 11D.

The interlayer film 11D has one end 11Da on one side in the widthwise direction, and the other end 11Db on the other side in the widthwise direction.

The interlayer film 11D includes the first resin layer 1D and the second resin layer 2D as with the interlayer film part 11DP. The colored part has the gradation part 2DX and the dark color part 2DY.

The interlayer film 11D may also be a roll body.

FIG. 17 is a sectional view schematically showing a laminated glass in a laminated glass set in accordance with a sixth embodiment of the present invention. FIG. 18 is a sectional view schematically showing an interlayer film for use in obtaining the laminated glass shown in FIG. 17.

A laminated glass 31E shown in FIG. 17 includes a cut piece obtained by cutting the interlayer film 11E shown in FIG. 18, as an interlayer film part 11EP.

The laminated glass 31E includes the first lamination glass member 21, the second lamination glass member 22, and the interlayer film part 11EP. The interlayer film part 11EP is arranged between the first lamination glass member 21 and the second lamination glass member 22. The first lamination glass member 21 is arranged on a first surface side of the interlayer film part 11EP to be layered thereon. The second lamination glass member 22 is arranged on a second surface side opposite to the first surface of the interlayer film part 11EP to be layered thereon.

The interlayer film part 11EP has one end 11Ea and the other end 11Eb at the opposite side of the one end 11Ea.

The interlayer film part 11EP includes a first resin layer 1E, a second resin layer 2E containing a coloring agent, a third resin layer 3E, and a fourth resin layer 4E. The second resin layer 2E reaches the one end 11Ea of the interlayer film part 11EP. The one end 11Ea part of the interlayer film part 11EP is configured by the second resin layer 2E, the first resin layer 1E, the third resin layer 3E and the fourth resin layer 4E. The second resin layer 2E forms a colored part.

On both surface sides of the second resin layer 2E, the first resin layer 1E is arranged. The second resin layer 2E is embedded in the first resin layer 1E. The first resin layer 1E is a surface layer of the interlayer film part 11EP. The second resin layer 2E is an intermediate layer of the interlayer film part 11EP.

The third resin layer 3E is arranged on a surface side opposite to the second resin layer 2E of the first resin layer 1E to be layered thereon. The fourth resin layer 4E is arranged on a surface side opposite to the first resin layer 1E of the third resin layer 3E to be layered thereon. The third resin layer 3E is an intermediate layer of the interlayer film part 11EP. The third resin layer 3E is a sound insulating layer. The fourth resin layer 4E is a surface layer of the interlayer film part 11EP.

The second resin layer 2E has a gradation part 2EX where visible light transmittance increases from the one end 11Ea side toward the other end 11Eb side of the interlayer film part 11EP. The second resin layer 2E has a dark color part 2EY on the one end 11Ea side of the interlayer film part 11EP. The second resin layer 2E reaches the one end 11Ea of the interlayer film part 11EP at the dark color part 2EY. The gradation part 2EX is a part where the thickness of the second resin layer 2E decreases from the one end 11Ea side toward the other end 11Eb side of the interlayer film part 11EP. The dark color part 2EY is a part where the thickness of the second resin layer 2E is uniform. In the interlayer film part 11EP, the colored part is configured by the gradation part 2EX and the dark color part 2EY. The gradation part 2EX forms a tip of the colored part on the other end 11Eb side of the interlayer film part 11EP.

FIG. 17 shows only one laminated glass 31E. By cutting the interlayer film 11E below, a plurality of cut pieces can be obtained. Using the plurality of cut pieces as the interlayer film parts 11EP, a plurality of laminated glasses 31E, namely a laminated glass set can be obtained.

FIG. 18 is a sectional view in the widthwise direction of the interlayer film 11E. The right and left direction of FIG. 18 is the widthwise direction of the interlayer film 11E. The fore-and-aft direction of FIG. 18 is the lengthwise direction of the interlayer film 11E.

The interlayer film 11E has one end 11Ea on one side in the widthwise direction, and the other end 11Eb on the other side in the widthwise direction.

The interlayer film 11E has the first resin layer 1E, the second resin layer 2E, the third resin layer 3E, and the fourth resin layer 4E as with the interlayer film part 11EP. The colored part has the gradation part 2EX and the dark color part 2EY.

The interlayer film 11E may also be a roll body.

FIG. 19 is a sectional view schematically showing a laminated glass in a laminated glass set in accordance with a seventh embodiment of the present invention. FIG. 20 is a sectional view schematically showing an interlayer film for use in obtaining the laminated glass shown in FIG. 19.

A laminated glass 31F shown in FIG. 19 includes a cut piece obtained by cutting the interlayer film 11F shown in FIG. 20, as an interlayer film part 11FP.

The laminated glass 31F includes the first lamination glass member 21, the second lamination glass member 22, and the interlayer film part 11FP. The interlayer film part 11FP is arranged between the first lamination glass member 21 and the second lamination glass member 22. The first lamination glass member 21 is arranged on a first surface side of the interlayer film part 11FP to be layered thereon. The second lamination glass member 22 is arranged on a second surface side opposite to the first surface of the interlayer film part 11FP to be layered thereon.

The interlayer film part 11FP has one end 11Fa and the other end 11Fb at the opposite side of the one end 11Fa.

The interlayer film part 11FP includes a first resin layer 1F, a second resin layer 2F containing a coloring agent, a functional film 5F, and a third resin layer 3F. The second resin layer 2F reaches the one end 11Fa of the interlayer film part 11FP. The one end 11Fa part of the interlayer film part 11FP is configured by the second resin layer 2F, the first resin layer 1F, the functional film 5F and the third resin layer 3F. The second resin layer 2F forms a colored part.

On both surface sides of the second resin layer 2F, the first resin layer 1F is arranged. The second resin layer 2F is embedded in the first resin layer 1F. The first resin layer 1F is a surface layer of the interlayer film part 11FP. The second resin layer 2F is an intermediate layer of the interlayer film part 11FP.

The functional film 5F is arranged on a surface side opposite to the second resin layer 2F of the first resin layer 1F to be layered thereon. The third resin layer 3F is arranged on a surface side opposite to the first resin layer 1F of the functional film 5F to be layered thereon. The functional film 5F is an intermediate layer of the interlayer film part 11FP. The third resin layer 3F is a surface layer of the interlayer film part 11FP. The functional film 5F is an infrared ray reflective film.

The second resin layer 2F has a gradation part 2FX where visible light transmittance increases from the one end 11Fa side toward the other end 11Fb side of the interlayer film part 11FP. The second resin layer 2F has a dark color part 2FY on the one end 11Fa side of the interlayer film part 11FP. The second resin layer 2F reaches the one end 11Fa of the interlayer film part 11FP at the dark color part 2FY. The gradation part 2FX is a part where the thickness of the second resin layer 2F decreases from the one end 11Fa side toward the other end 11Fb side of the interlayer film part 11FP. The dark color part 2FY is a part where the thickness of the second resin layer 2F is uniform. In the interlayer film part 11FP, the colored part is configured by the gradation part 2FX and the dark color part 2FY. The gradation part 2FX forms a tip of the colored part on the other end 11Fb side of the interlayer film part 11FP.

FIG. 19 shows only one laminated glass 31F. By cutting the interlayer film 11F below, a plurality of cut pieces can be obtained. Using the plurality of cut pieces as the interlayer film parts 11FP, a plurality of laminated glasses 31F, namely a laminated glass set can be obtained.

FIG. 20 is a sectional view in the widthwise direction of an interlayer film 11F. The right and left direction of FIG. 20 is the widthwise direction of the interlayer film 11F. The fore-and-aft direction of FIG. 20 is the lengthwise direction of the interlayer film 11F.

The interlayer film 11F has one end 11Fa on one side in the widthwise direction, and the other end 11Fb on the other side in the widthwise direction.

The interlayer film 11F has the first resin layer 1F, the second resin layer 2F, the functional film 5F, and the third resin layer 3F, as with the interlayer film part 11FP. The colored part has the gradation part 2FX and the dark color part 2FY.

The interlayer film 11F may also be a roll body.

FIG. 21 is a sectional view schematically showing a laminated glass in a laminated glass set in accordance with an eighth embodiment of the present invention. FIG. 22 is a sectional view schematically showing an interlayer film for use in obtaining the laminated glass shown in FIG. 21.

A laminated glass 31G shown in FIG. 21 includes a cut piece obtained by cutting the interlayer film 11G shown in FIG. 22, as an interlayer film part 11GP.

The laminated glass 31G includes the first lamination glass member 21, the second lamination glass member 22, and the interlayer film part 11GP. The interlayer film part 11GP is arranged between the first lamination glass member 21 and the second lamination glass member 22. The first lamination glass member 21 is arranged on a first surface side of the interlayer film part 11GP to be layered thereon. The second lamination glass member 22 is arranged on a second surface side opposite to the first surface of the interlayer film part 11GP to be layered thereon.

The interlayer film part 11GP has one end 11Ga and the other end 11Gb at the opposite side of the one end 11Ga.

The interlayer film part 11GP includes a first resin layer 1G, a second resin layer 2G containing a coloring agent, a functional film 5G, a third resin layer 3G, and a fourth resin layer 4G containing a coloring agent. The second resin layer 2G and the fourth resin layer 4G reach one end 11Ga of the interlayer film part 11GP. The one end 11Ga part of the interlayer film part 11GP is configured by the second resin layer 2G, the first resin layer 1G, the functional film 5G, the fourth resin layer 4G and the third resin layer 3G. The second resin layer 2G forms a colored part. The fourth resin layer 4G forms a colored part.

On both surface sides of the second resin layer 2G, the first resin layer 1G is arranged. The second resin layer 2G is embedded in the first resin layer 1G. The first resin layer 1G is a surface layer of the interlayer film part 11GP. The second resin layer 2G is an intermediate layer of the interlayer film part 11GP. On both surface sides of the fourth resin layer 4G, the third resin layer 3G is arranged. The fourth resin layer 4G is embedded in the third resin layer 3G. The third resin layer 3G is a surface layer of the interlayer film part 11GP. The fourth resin layer 4G is an intermediate layer of the interlayer film part 11GP.

The functional film 5G is arranged on a surface side opposite to the second resin layer 2G of the first resin layer 1G to be layered thereon. The functional film 5G is arranged on a surface side opposite to the fourth resin layer 4G of the third resin layer 3G to be layered thereon. The functional film 5G is an infrared ray reflective film.

The second resin layer 2G has a gradation part 2GX where visible light transmittance increases from the one end 11Ga side toward the other end 11Gb side of the interlayer film part 11GP. The second resin layer 2G has a dark color part 2GY on the one end 11Ga side of the interlayer film part 11GP. The second resin layer 2G reaches the one end 11Ga of the interlayer film part 11GP at the dark color part 2GY. The gradation part 2GX is a part where the thickness of the second resin layer 2G decreases from the one end 11Ga side toward the other end 11Gb side of the interlayer film part 11GP. The dark color part 2GY is a part where the thickness of the second resin layer 2G is uniform.

The fourth resin layer 4G has a gradation part 4GX where visible light transmittance increases from the one end 11Ga side toward the other end 11Gb side of the interlayer film part 11GP. The fourth resin layer 4G has the dark color part 4GY on the one end 11Ga side of the interlayer film part 11GP. The fourth resin layer 4G reaches the one end 11Ga of the interlayer film part 11GP at the dark color part 4GY. The gradation part 4GX is a part where the thickness of the fourth resin layer 4G decreases from the one end 11Ga side toward the other end 11Gb side of the interlayer film part 11GP. The dark color part 4GY is a part where the thickness of the fourth resin layer 4G is uniform.

In the interlayer film part 11GP, the colored part is configured by the gradation part 2GX and the dark color part 2GY. The gradation part 2GX forms a tip of the colored part on the other end 11Gb side of the interlayer film part 11GP. Also, in the interlayer film part 11GP, the colored part is configured by the gradation part 4GX and the dark color part 4GY. The gradation part 4GX forms a tip of the colored part on the other end 11Gb side of the interlayer film part 11GP.

FIG. 21 shows only one laminated glass 31G. By cutting the interlayer film 11G below, a plurality of cut pieces can be obtained. Using the plurality of cut pieces as the interlayer film parts 11GP, a plurality of laminated glasses 31G, namely a laminated glass set can be obtained.

FIG. 22 is a sectional view in the widthwise direction of an interlayer film 11G. The right and left direction of FIG. 22 is the widthwise direction of the interlayer film 11G. The fore-and-aft direction of FIG. 22 is the lengthwise direction of the interlayer film 11G.

The interlayer film 11G has one end 11Ga on one side in the widthwise direction, and the other end 11Gb on the other side in the widthwise direction.

The interlayer film part 11GP has the first resin layer 1G, the second resin layer 2G containing a coloring agent, the functional film 5G, the third resin layer 3G, and the fourth resin layer 4G containing a coloring agent as with the interlayer film part 11GP. The colored part has the gradation parts 2GX, 4GX and the dark color parts 2GY, 4GY.

The interlayer film 11G may also be a roll body.

FIG. 23 is a front view showing a laminated glass set including a plurality of laminated glasses shown in FIG. 1.

FIG. 23 schematically shows the colored state. The darker the color tone, the lower the visible light transmittance. In a laminated glass set 71 shown in FIG. 23, the laminated glass 31 is used among the laminated glasses 31, 31A, 31B, 31C, 31D, 31E, 31F, 31G as described above. The laminated glass set 71 includes a plurality of laminated glasses 31. In FIG. 23, a plurality of laminated glasses 31 are arranged. In the laminated glass set 71, the plurality of laminated glasses 31 are handled as a set article. The interlayer film part 11P (the symbol is not shown) constituting the plurality of laminated glasses 31 in the laminated glass set 71 is obtained from one interlayer film 11.

FIG. 24 is a front view showing the first example of a laminated glass structure using the laminated glass set shown in FIG. 23.

FIG. 24 schematically shows the colored state. The darker the color tone, the lower the visible light transmittance. In a laminated glass structure 81 shown in FIG. 24, the laminated glass 31 is used among the laminated glasses 31, 31A, 31B, 31C, 31D, 31E, 31F, 31G as described above. In the laminated glass structure 81, the laminated glass set 71 is used.

The laminated glass structure 81 includes the laminated glass set 71 and a connecting member 91. In the present embodiment, the connecting member 91 connects the laminated glasses 31 arranged in line. The connecting member 91 is a connecting member, and is a hinge. The hinge connects two laminated glasses 31. Two laminated glasses 31 are connected by one hinge. In the laminated glass structure 81 can be bent forward or backward in FIG. 24. The laminated glass structure 81 can be folded at the connecting member 91 part.

FIG. 25 is a front view showing the second example of a laminated glass structure using the laminated glass set shown in FIG. 23.

FIG. 25 schematically shows the colored state. In a laminated glass structure 82 shown in FIG. 25, the laminated glass 31 is used among the laminated glasses 31, 31A, 31B, 31C, 31D, 31E, 31F, 31G as described above. In the laminated glass structure 82, the laminated glass set 71 is used.

The laminated glass structure 82 includes the laminated glass set 71 and a connecting member 92. In the present embodiment, the connecting member 92 connects the laminated glasses 31 arranged in line. The connecting member 92 is a connecting member, and is a frame member. The connecting member 92 surrounds the outer periphery of the laminated glass 31. The laminated glass 31 is attached to an opening of the connecting member 92.

FIG. 26 is a front view showing a laminated glass structure prepared with a conventional laminated glass set.

FIG. 26 schematically shows the colored state. In a laminated glass structure 101, a conventional interlayer film 102 is used.

As shown in FIG. 26, the laminated glass structure prepared with a conventional laminated glass set has a problem that the variation in the position of the colored part, or the position of a tip of the colored part (tip of the gradation part) (broken line part in FIG. 26) is large.

In contrast to this, the laminated glass structures 81, 82 can reduce the variation in the position of the colored part and the position of a tip of the colored part (tip of the gradation part) (broken line part in FIGS. 24, 25) because the aforementioned laminated glass 31 is used.

Hereinafter, other details of members constituting the interlayer film and the laminated glass set are described.

(First and Second Lamination Glass Members)

Examples of the first and second lamination glass members include a glass plate, a PET (polyethylene terephthalate) film, and the like. As the laminated glass, laminated glass in which an interlayer film (interlayer film part) is sandwiched between a glass plate and a PET film or the like, as well as laminated glass in which an interlayer film (interlayer film part) is sandwiched between two glass plates, is included. The laminated glass is a laminate provided with a glass plate, and it is preferred that at least one glass plate be used. It is preferred that each of the first and second lamination glass members be a glass plate or a PET (polyethylene terephthalate) film and the laminated glass include at least one glass plate as the first and second lamination glass members. It is especially preferred that both of the first and second lamination glass members be glass plates.

Examples of the glass plate include a sheet of inorganic glass and a sheet of organic glass. Examples of the inorganic glass include float plate glass, heat ray-absorbing plate glass, heat ray-reflecting plate glass, polished plate glass, figured plate glass, net plate glass, wired plate glass, green glass, and the like. The organic glass is synthetic resin glass substituted for inorganic glass. Examples of the organic glass include a polycarbonate plate, a poly(meth)acrylic resin plate, and the like. Examples of the poly(meth)acrylic resin plate include a polymethyl (meth)acrylate plate, and the like.

Although respective thicknesses of the first lamination glass member and the second lamination glass member are not particularly limited, the thickness is preferably 1 mm or more and preferably 5 mm or less. When the lamination glass member is a glass plate, the thickness of the glass plate is preferably 1 mm or more and is preferably 5 mm or less. When the lamination glass member is a PET film, the thickness of the PET film is preferably 0.03 mm or more and is preferably 0.5 mm or less.

The thickness of the first and second lamination glass members means an average thickness.

(Interlayer Film)

The thickness of the interlayer film is not particularly limited. From the viewpoint of the practical aspect and the viewpoint of sufficiently enhancing the penetration resistance and the flexural rigidity of laminated glass, the thickness of the interlayer film is preferably 0.1 mm or more, more preferably 0.25 mm or more, and is preferably 3 mm or less, more preferably 1.5 mm or less. When the thickness of the interlayer film is the above lower limit or more, the penetration resistance and the flexural rigidity of laminated glass are further enhanced. When the thickness of the interlayer film is the above upper limit or less, the transparency of the interlayer film is further improved.

The thickness of the interlayer film means an average thickness.

Resin:

It is preferred that the interlayer film contain a resin. It is preferred that the first resin layer contain a resin. It is preferred that the second resin layer contain a resin. It is preferred that the third resin layer contain a resin. It is preferred that the fourth resin layer contain a resin. Examples of the resin include thermosetting resins and thermoplastic resins, and the like. One kind of the resin may be used alone, and two or more kinds thereof may be used in combination.

Examples of the thermoplastic resin include a polyvinyl acetal resin, a polyester resin, an ethylene-vinyl acetate copolymer resin, an ethylene-acrylic acid copolymer resin, a polyurethane resin, a polyvinyl alcohol resin, and the like. Thermoplastic resins other than these may be used.

Plasticizer:

It is preferred that the interlayer film contain a plasticizer. It is preferred that the first resin layer contain a plasticizer. It is preferred that the second resin layer contain a plasticizer. It is preferred that the third resin layer contain a plasticizer. It is preferred that the fourth resin layer contain a plasticizer. When the thermoplastic resin contained in the interlayer film is a polyvinyl acetal resin, it is especially preferred that the interlayer film (the respective layers) contain a plasticizer. One kind of the plasticizer may be used alone and two or more kinds thereof may be used in combination.

Examples of the plasticizer include organic ester plasticizers such as a monobasic organic acid ester and a polybasic organic acid ester, organic phosphate plasticizers such as an organic phosphate plasticizer and an organic phosphite plasticizer, and the like. Organic ester plasticizers are preferred. It is preferred that the plasticizer be a liquid plasticizer.

Examples of the monobasic organic acid ester include a glycol ester obtained by the reaction of a glycol with a monobasic organic acid, and the like. Examples of the glycol include triethylene glycol, tetraethylene glycol, tripropylene glycol, and the like. Examples of the monobasic organic acid include butyric acid, isobutyric acid, caproic acid, 2-ethylbutyric acid, heptanoic acid, n-octylic acid, 2-ethylhexanoic acid, n-nonylic acid, decylic acid, benzoic acid and the like.

Examples of the polybasic organic acid ester include an ester compound of a polybasic organic acid and an alcohol having a linear or branched structure of 4 to 8 carbon atoms. Examples of the polybasic organic acid include adipic acid, sebacic acid, azelaic acid, and the like.

Examples of the organic ester plasticizer include triethylene glycol di-2-ethylpropanoate, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, diethylene glycol dibenzoate, dipropylene glycol dibenzoate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic alkyds, a mixture of a phosphoric acid ester and an adipic acid ester, and the like. Organic ester plasticizers other than these may be used. Other adipic acid esters other than the above-described adipic acid esters may be used.

Examples of the organic phosphate plasticizer include tributoxyethyl phosphate, isodecyl phenyl phosphate, triisopropyl phosphate, and the like.

It is preferred that the plasticizer be a diester plasticizer represented by the following formula (1).

[Chemical 1]

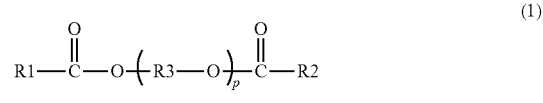

In the foregoing formula (1), R1 and R2 each represent an organic group with 5 to 10 carbon atoms, R3 represents an ethylene group, an isopropylene group, or an n-propylene group, and p represents an integer of 3 to 10. It is preferred that R1 and R2 in the foregoing formula (1) each be an organic group with 6 to 10 carbon atoms.

It is preferred that the plasticizer include triethylene glycol di-2-ethylhexanoate (3GO), triethylene glycol di-2-ethylbutyrate (3GH) or triethylene glycol di-2-ethylpropanoate. It is more preferred that the plasticizer include triethylene glycol di-2-ethylhexanoate (3GO) or triethylene glycol di-2-ethylbutyrate (3GH), and it is further preferred that the plasticizer include triethylene glycol di-2-ethylhexanoate.

In the interlayer film, a content of the plasticizer relative to 100 parts by mass of the resin (when the resin is thermoplastic resin, 100 parts by mass of the thermoplastic resin; when the resin is polyvinyl acetal resin, 100 parts by mass of the polyvinyl acetal resin) is referred to as content (0). The content (0) is preferably 25 parts by mass or more, more preferably 30 parts by mass or more, and is preferably 100 parts by mass or less, more preferably 60 parts by mass or less, further preferably 50 parts by mass or less. When the content (0) is the above lower limit or more, the penetration resistance of laminated glass is further enhanced. When the content (0) is the above upper limit or less, the transparency of the interlayer film is further enhanced.

(Coloring Agent)

It is preferred that the interlayer film contain a coloring agent. It is preferred that the interlayer film part contain a coloring agent. It is preferred that the second resin layer contain a coloring agent. Each of the first resin layer, the third resin layer and the fourth resin layer may contain a coloring agent. It is preferred that at least one of the first resin layer and the second resin layer contain a coloring agent. Both the first resin layer and the second resin layer may contain a coloring agent. Examples of the coloring agent include inorganic particles, a dye, a pigment and the like.

Examples of the inorganic particles include carbon black particles, carbon nanotube particles, graphene particles, iron oxide particles, zinc oxide particles, calcium carbonate particles, alumina particles, kaolin clay particles, calcium silicate particles, magnesium oxide particles, magnesium hydroxide particles, aluminum hydroxide particles, magnesium carbonate particles, talc particles, feldspar powder particles, mica particles, barite particles, barium carbonate particles, titanium oxide particles, silica particles, and glass beads, and the like. One kind of the inorganic particles may be used alone, and two or more kinds thereof may be used in combination.

It is preferred that the inorganic particles include carbon black particles, carbon nanotube particles, graphene particles, calcium carbonate particles, titanium oxide particles or silica particles, and it is more preferred that the inorganic particles include calcium carbonate particles. By using these preferred inorganic particles, unevenness in appearance is suppressed when the light penetrates, and laminated glass having still further excellent appearance designability is obtained.

The average particle diameter of the inorganic particles is preferably 0.01 μm or more, more preferably 0.5 μm or more, and is preferably 100 μm or less, more preferably 50 μm or less, further preferably 10 μm or less. The average particle diameter refers to the weight average particle diameter. The average particle diameter can be measured by a dynamic light scattering method with a light scattering measuring device and a laser as a light source. Examples of the light scattering measuring device include "DLS-6000AL" available from OTSUKA ELECTRONICS Co., LTD., and the like.

Examples of the dye include a pyrene-based dye, an aminoketone-based dye, an anthraquinone-based dye, and an azo-based dye, and the like. One kind of the dye may be used alone, and two or more kinds thereof may be used in combination.

Examples of the pyrene-based dye include Solvent Green 5 (CAS79869-59-3) and Solvent Green 7 (CAS6358-69-6), and the like.

Examples of the aminoketone-based dye include Solvent Yellow 98 (CAS12671-74-8), Solvent Yellow 85 (CAS12271-01-1) and Solvent Red 179 (CAS8910-94-5), and Solvent Red 135 (CAS71902-17-5), and the like.

Examples of the anthraquinone-based dye include Solvent Yellow 163 (CAS13676091-0), Solvent Red 207 (CAS15958-69-6), Disperse Red 92 (CAS12236-11-2), Solvent Violet 13 (CAS81-48-1), Disperse Violet 31 (CAS6408-72-6), Solvent Blue 97 (CAS61969-44-6), Solvent Blue 45 (CAS37229-23-5), Solvent Blue 104 (CAS116-75-6) and Disperse Blue 214 (CAS104491-84-1), and the like.

Examples of the azo-based dye include Solvent Yellow30 (CAS3321-10-4), Solvent Red 164 (CAS70956-30-8), and Disperse Blue 146 (CAS88650-91-3), and the like.

The pigment may be an organic pigment and may be an inorganic pigment. The organic pigment may be an organic pigment having a metal atom, and may be an organic pigment not having a metal atom. One kind of the pigment may be used alone, and two or more kinds thereof may be used in combination.

Examples of the organic pigment include a phthalocyanine compound, a quinacridone compound, an azo compound, a pentaphene compound, a perylene compound, an indole compound and a dioxazine compound, and the like.

When the first resin layer contains a coloring agent, it is more preferred that the first resin layer contain carbon black particles, carbon nanotube particles, graphene particles, calcium carbonate particles, titanium oxide particles, silica particles or a phthalocyanine compound, and it is especially preferred that the first resin layer contain calcium carbonate particles. It is more preferred that the second resin layer contain carbon black particles, carbon nanotube particles, graphene particles, calcium carbonate particles, titanium oxide particles, silica particles or a phthalocyanine compound, and it is especially preferred that the second resin layer contain calcium carbonate particles. By using these ingredients, unevenness in appearance is suppressed when the light penetrates, and laminated glass having still further excellent appearance designability is obtained.

Other Ingredients:

Each of the interlayer film, the light color part, and the colored part may contain additives such as heat shielding particles, a light shielding agent, a coloring agent, a UV absorber, an oxidation inhibitor, an adhesive force adjusting agent, a light stabilizer, a flame retarder, an antistatic agent, a moisture-proof agent, a heat rays reflector and a heat rays absorber, and the like, as necessary. One kind of the additives may be used alone and two or more kinds thereof may be used in combination.

The first resin layer may contain the heat shielding particles. The second resin layer may contain the heat shielding particles. The third resin layer may contain the heat shielding particles. The fourth resin layer may contain the heat shielding particles. The energy amount of an infrared ray with a wavelength of 780 nm or longer which is longer than that of visible light is small as compared with an ultraviolet ray. However, the thermal action of infrared rays is large, and when infrared rays are absorbed into a substance, heat is released from the substance. Accordingly, infrared rays are generally called heat rays. By the use of the heat shielding particles, infrared rays (heat rays) can be effectively cut off. In this connection, the heat shielding particle means a particle capable of absorbing infrared rays. Since the interlayer film contains heat shielding particles, it is possible to improve the heat shielding property and the appearance designability of the laminated glass.

Specific examples of the heat shielding particles include metal oxide particles such as aluminum-doped tin oxide particles, indium-doped tin oxide particles, antimony-doped tin oxide particles (ATO particles), gallium-doped zinc oxide particles (GZO particles), indium-doped zinc oxide particles (IZO particles), aluminum-doped zinc oxide particles (AZO particles), niobium-doped titanium oxide particles, sodium-doped tungsten oxide particles, cesium-doped tungsten oxide particles, thallium-doped tungsten oxide particles, rubidium-doped tungsten oxide particles, tin-doped indium oxide particles (ITO particles), tin-doped zinc oxide particles and silicon-doped zinc oxide particles, lanthanum hexaboride ($LaB_6$) particles, and the like. Heat shielding particles other than these may be used. One kind of the heat shielding particles may be used alone, and two or more kinds thereof may be used in combination.

The average particle diameter of the heat shielding particles is preferably 10 nm or more, more preferably 20 nm or more, and is preferably 100 nm or less, more preferably 80 nm or less, further preferably 50 nm or less. When the average particle diameter is the above lower limit or more, it is possible to sufficiently enhance the heat ray shielding property. When the average particle diameter is the above upper limit or less, the dispersibility of heat shielding particles is enhanced.

The "average particle diameter" refers to the volume average particle diameter. The average particle diameter can be measured using a particle size distribution measuring apparatus ("UPA-EX150" available from NIKKISO CO., LTD.), or the like.

Combination with Other Functional Film:

The interlayer film part of the laminated glass set according to the present invention may include other functional film for the purpose of realizing other function. Examples of the functional film include an infrared reflective film, a colored film, and a film with design printing, and the like. For example, in order to enhance the heat shielding property, the interlayer film part may include an infrared reflective film. For example, in order to further improve the designability, or combine with other pattern, the interlayer film part may include a colored film, or may include a film with design printing.

In the interlayer film including a functional film, for example, it is preferred that the first resin layer and the second resin layer be arranged on a first surface side of the functional film, the third resin layer be arranged on a second surface side opposite to the first surface of the functional film, and the second resin layer be arranged between the first resin layers. In the interlayer film including a functional film, the layer arranged on the first surface side of the functional film may be a single layer or may be multi-layered. In the interlayer film including a functional film, the layer arranged on the second surface side of the functional film may be a single layer or may be multi-layered. The interlayer film including a functional film may include the first resin layer, the second resin layer and the third resin layer, or may include the first resin layer, the second resin layer, the third resin layer and the fourth resin layer on the first surface side of the functional film. Also, the interlayer film including a functional film may include the third resin layer and the fourth resin layer on the second surface side of the functional film.

Examples of the infrared reflective film include a resin film with metal foil, a multilayer laminate film in which a metal layer and a dielectric layer are formed on a resin film, a multilayer resin film, and a liquid crystal film, and the like. These films have the property of reflecting infrared rays.

The resin film with metal foil includes a resin film, and a metal foil layered on the outer surface of the resin film. Examples of the material of the resin film include a polyethylene terephthalate resin, a polyethylene naphthalate resin, a polyvinyl acetal resin, an ethylene-vinyl acetate copolymer resin, an ethylene-acrylic acid copolymer resin, a polyurethane resin, a polyvinyl alcohol resin, a polyolefin resin, a polyvinyl chloride resin, and a polyimide resin. Examples of the material of the metal foil include aluminum, copper, silver, gold, palladium, and alloys containing these metals.

The multilayer laminate film in which a metal layer and a dielectric layer are formed on a resin film is a multilayer laminate film in which any number of layers of the metal layer and the dielectric layer are alternately layered on the resin film. In the multilayer laminate film in which a metal layer and a dielectric layer are formed on a resin layer, it is preferred that all of the metal layers and the dielectric layers be layered alternately, however, there may be a structural part in which a metal layer and a dielectric layer are not layered alternately as exemplified by metal layer/dielectric layer/metal layer/dielectric layer/metal layer/metal layer/dielectric layer/metal layer.

Examples of the material of the resin film in the multilayer laminate film include polyethylene, polypropylene, polylactic acid, poly(4-methylpentene-1), polyvinylidene fluoride, cyclic polyolefin, polymethyl methacrylate, polyvinyl chloride, polyvinyl alcohol, polyamide such as nylon 6, 11, 12, 66 and the like, polystyrene, polycarbonate, polyethylene terephthalate, polyethylene naphthalate, polyester, polyphenylene sulfide, and polyether imide. As the material of the metal layer in the multilayer laminate film, those exemplified as the material of the metal foil in the resin film with metal foil can be exemplified. A coating layer of metal or a mixed oxide of metal can be given to the both faces or either face of the metal layer. Examples of the material of the coating layer include ZnO, $Al_2O_3$, $Ga_2O_3$, $InO_3$, MgO, Ti, NiCr and Cu. Also, examples of the dielectric layer in the multilayer laminate film include indium oxide.

The multilayer resin film is a laminate film in which a plurality of resin films are layered. As the material of the multilayer resin film, those exemplified as the material of the resin film in the multilayer laminate film can be exemplified. The number of layered resin films in the multilayer resin film is 2 or more, and may be 3 or more, and may be 5 or more. The number of layered resin films in the multilayer resin film may be 1000 or less, and may be 100 or less, and may be 50 or less.

The multilayer resin film may be a multilayer resin film in which any number of layers of two or more kinds of thermoplastic resin films having different optical properties (refractive index) are layered alternately or randomly. Such a multilayer resin film is so configured that a desired infrared reflecting property is obtained.

As the liquid crystal film, a film in which any number of layers of cholesteric liquid crystal layers that reflect the light of any wavelength are layered can be recited. Such a liquid crystal film is so configured that desired infrared reflecting property is obtained.

The infrared reflective film may contain infrared reflective particles. The infrared reflective particles are particles having the infrared reflecting property, and for example, tabular particles having a thickness of 1 nm or more and 1000 μm or less can be recited. For example, in the resin film in which silver nano tabular particles are dispersed, an infrared reflective film having infrared reflecting property is obtained by adjusting the thickness, the surface area and the arrangement state of the silver nano tabular particles.

Hereinafter, the present invention will be described in more detail with reference to examples. The present invention is not limited only to the following examples.

The following materials were prepared.
(Resin)
   Polyvinyl butyral resin 1 (polymerization degree: 1700, amount of acetal group: 69 mol %, amount of hydroxyl group: 30 mol %, amount of acetyl group: 1 mol %) (hereinafter, also referred to as PVB1)
   Polyvinyl butyral resin 2 (polymerization degree: 1700, amount of acetal group: 70 mol %, amount of hydroxyl group: 18 mol %, amount of acetyl group: 12 mol %) (hereinafter, also referred to as PVB2)
   Polyvinyl butyral resin 3 (polymerization degree: 2300, amount of acetal group: 70 mol %, amount of hydroxyl group: 18 mol %, amount of acetyl group: 12 mol %) (hereinafter, also referred to as PVB3)
   Polyvinyl butyral resin 4 (polymerization degree: 3300, amount of acetal group: 70 mol %, amount of hydroxyl group: 18 mol %, amount of acetyl group: 12 mol %) (hereinafter, also referred to as PVB4)
   Polyvinyl butyral resin 5 (polymerization degree: 1700, amount of acetal group: 74 mol %, amount of hydroxyl group: 18 mol %, amount of acetyl group: 8 mol %) (hereinafter, also referred to as PVB5)
(Plasticizer)
   Triethylene glycol-2-ethylhexanoate (hereinafter, sometimes described as 3GO)
(Coloring Agent)
   Calcium carbonate: calcium carbonate particles ("SUPER 4S" available from MARUO CALCIUM CO., LTD.
   Blue pigment: copper phthalocyanine pigment (Pigment Blue 15)
   Black pigment: carbon black (Pigment Black 7)
(Heat Shielding Particles)
   ITO: tin-doped indium oxide particles (average particle diameter: 50 nm)
   CWO: cesium-doped tungsten oxide particles (average particle diameter: 50 nm)
(Functional Film: Infrared Reflective Film)
   3M90S (multilayer resin film, "Multilayer Nano 90S" available from Sumitomo 3M Limited)
   XIR (resin film with metal foil, "XIR-75" available from Southwall Technologies)

Example 1

In Example 1, a plurality of laminated glasses as shown in FIG. 1 were prepared.

Preparation of Resin Composition for Forming First Resin Layer:

As shown in the following Table 1, 100 parts by mass of PVB1 and 40 parts by mass of 3GO were mixed, and sufficiently kneaded with a mixing roll, to obtain a resin composition A1 for forming a first resin layer.

Preparation of Resin Composition for Forming Second Resin Layer:

As shown in the following Table 1, 100 parts by mass of PVB1, 40 parts by mass of 3GO, and calcium carbonate that was mixed so that the concentration in the obtained composition was 6.13% by mass were mixed, and sufficiently kneaded with a mixing roll, to obtain a resin composition B1 for forming a second resin layer.

Preparation of Interlayer Film:

The resin composition A1 for forming a first resin layer and the resin composition B1 for forming a second resin layer were co-extruded with a co-extruder, and then wound to obtain a roll body of the interlayer film having a length of 40 m. At this time, the revolving speed of the gear pump was PID controlled on the basis of the discharge pressure and the inlet pressure measured every 0.1 seconds, and parameters of the control function were optimized, and thus variation in the inlet pressure in a long period of 180 seconds was suppressed. Specifically, as shown in the following Table 2, difference between the maximum value and the minimum value of the inlet pressure (inlet pressure variation) in 180 seconds was set at $30\times10^5$ Pa in the gear pump 1 for extruding the resin composition A1 for forming a first resin layer. Also, as shown in the following Table 2, difference between the maximum value and the minimum value of the inlet pressure (inlet pressure variation) in 180 seconds was set at $30\times10^5$ Pa in the gear pump 1 for extruding the resin composition B1 for forming a second resin layer. The linear velocity at the time of extrusion was 10 m/min. In Example 1, the width of the interlayer film was 1800 mm.

Preparation of Laminated Glass Set:

Taking the position of one end in the lengthwise direction of the interlayer film as a starting position, 20 divisional positions were set at 1.5 m intervals from one end toward the other end in the lengthwise direction of the interlayer film.

At each divisional position, the interlayer film was cut out to obtain an interlayer film part having a short-side dimension (lengthwise direction of the interlayer film) of 1.5 m, and a long-side dimension and a thickness that are equivalent to the width and the thickness of the interlayer film. The interlayer film was cut out with a cutter knife or scissors. Since the divisional positions were set at 20 positions in the lengthwise direction in the obtained interlayer film, 20 interlayer film parts were obtained. These 20 interlayer film parts were named interlayer film part (1), interlayer film part (2), interlayer film part (3), . . . , and interlayer film part (20) in this order from a tip side of the outer periphery of the roll body of the interlayer film (one end side of the interlayer film). The interlayer film part (20) is an interlayer film located on a tip side of the internal circumference of the roll body of the interlayer film (the other end side of the interlayer film). It is to be noted that the direction connecting one end and the other end of the interlayer film part (long-side direction of the interlayer film part) corresponds to the widthwise direction of the interlayer film.

Each obtained interlayer film part was sandwiched between two sheets of clear glass in conformity with JIS R3202:2011 and having a visible light transmittance of 90.4% and a thickness of 2.5 mm, and vacuum-pressed by retention at 90° C. for 30 minutes with a vacuum laminator, and thus the stack was temporarily joined. Next, an autoclaving treatment at 130° C. for 20 minutes was performed to obtain 20 laminated glasses. The clear class had a short-side dimension of 1.5 m and a long-side dimension that is equivalent to the width of the interlayer film part. In this manner, laminated glass (1) prepared with interlayer film part (1), laminated glass (2) prepared with interlayer film part (2), laminated glass (3) prepared with interlayer film part (3), . . . , laminated glass (20) prepared with interlayer film part (20) were obtained.

Examples 2 to 24 and Comparative Examples 1 and 2

In Examples 2 to 24, interlayer films as shown in FIG. 2 were prepared. In Comparative Examples 1 and 2, interlayer films similar to the interlayer film as shown in FIG. 2 were prepared. A laminated glass set was prepared with the obtained interlayer film in the same manner as in Example 1.

The composition, the blending amount, and the extrusion conditions of the resin composition for forming a first resin layer, and the composition, the blending amount, and the extrusion conditions of the resin composition for forming a second resin layer were changed to the conditions described in Table 1 to Table 6, and the width of the interlayer film was changed to the value described in Table 1 to Table 6. Besides this, an interlayer film for laminated glass, a roll body thereof and a laminated glass set were prepared in the same manner as that in Example 1. In the cases of extrusion conditions of the types a1, a2 and a3 in Table 2, a gear pump 2 was connected with the gear pump 1 in series at the time of extruding a resin composition for forming a first resin layer, and the conditions described in Table 2 were employed.

Examples 25 and 26

In Examples 25 and 26, the interlayer film 1 of Example 1 as shown in FIG. 2 (1800 mm wide) was prepared.

In the same manner as that in Example 1, the interlayer film was prepared, and the interlayer film parts were cut out. Two sheets of clear glass having a thickness of 2.5 mm in conformity with JIS R3202:2011 and having a visible light transmittance of 90.4% were prepared. The clear class had a short-side dimension of 1.5 m and a long-side dimension described in Table 7. Each interlayer film part was sandwiched between two clear glasses such that the short side of the clear glass and one end of the interlayer film part are parallel with each other, and the short side of the clear glass is located at the position described in Table 7 from one end of the interlayer film, and vacuum-pressed by retention at 90° C. for 30 minutes with a vacuum laminator, and thus the stack was temporarily joined. Next, an autoclaving treatment at 130° C. for 20 minutes was performed to obtain 20 laminated glasses.

In this manner, laminated glass (1) prepared with interlayer film part (1), laminated glass (2) prepared with interlayer film part (2), laminated glass (3) prepared with interlayer film part (3), . . . , laminated glass (20) prepared with interlayer film part (20) were obtained. That is, 20 laminated glasses were obtained.

Examples 27 and 28

In Examples 27 and 28, the interlayer film 5 of Example 5 as shown in FIG. 2 (1800 mm wide) was prepared.

In the same manner as that in Example 1, the interlayer film parts were cut out. Two sheets of clear glass having a thickness of 2.5 mm in conformity with JIS R3202:2011 and having a visible light transmittance of 90.4% were prepared. The clear class had a short-side dimension of 1.5 m and a long-side dimension described in Table 8. Each interlayer film part was sandwiched between two clear glasses such that the short side of the clear glass and one end of the interlayer film part are parallel with each other, and the short side of the clear glass is located at the position described in Table 8 from one end of the interlayer film, and vacuum-pressed by retention at 90° C. for 30 minutes with a vacuum laminator, and thus the stack was temporarily joined. Next, an autoclaving treatment at 130° C. for 20 minutes was performed to obtain 20 laminated glasses.

In this manner, laminated glass (1) prepared with interlayer film part (1), laminated glass (2) prepared with interlayer film part (2), laminated glass (3) prepared with interlayer film part (3), . . . , laminated glass (20) prepared with interlayer film part (20) were obtained. That is, 20 laminated glasses were obtained.

Examples 29 and 30

In Examples 29 and 30, the interlayer film 7 of Example 7 as shown in FIG. 2 (2600 mm wide) was prepared.

In the same manner as that in Example 1, the interlayer film parts were cut out. Two sheets of clear glass having a thickness of 2.5 mm in conformity with JIS R3202:2011 and having a visible light transmittance of 90.4% were prepared. The clear class had a short-side dimension of 1.5 m and a long-side dimension described in Table 9. Each interlayer film part was sandwiched between two clear glasses such that the short side of the clear glass and one end of the interlayer film part are parallel with each other, and the short side of the clear glass is located at the position described in Table 9 from one end of the interlayer film, and vacuum-pressed by retention at 90° C. for 30 minutes with a vacuum laminator, and thus the stack was temporarily joined. Next, an autoclaving treatment at 130° C. for 20 minutes was performed to obtain 20 laminated glasses.

In this manner, laminated glass (1) prepared with interlayer film part (1), laminated glass (2) prepared with interlayer film part (2), laminated glass (3) prepared with interlayer film part (3), . . . , laminated glass (20) prepared with interlayer film part (20) were obtained. That is, 20 laminated glasses were obtained.

Examples 31 to 33

In Examples 31 to 33, a functional film (infrared reflective film) was sandwiched between the first resin layer and the second resin layer, and the third resin layer to prepare an interlayer film as shown in FIG. 20. A laminated glass set was prepared with the obtained interlayer film in the same manner as in Example 1.

Examples 34 to 37

In Examples 34 to 37, interlayer films as shown in FIG. 18 were prepared. A laminated glass set was prepared with the obtained interlayer film in the same manner as in Example 1. The third resin layer in the interlayer film of each of Examples 34 to 37 is a sound insulating layer.
(Evaluation)
(1) Measurement of Visible Light Transmittance Using a spectrophotometer ("U-4100" available from Hitachi High-Tech Science Corporation), visible light transmittance (Tv) was measured for each laminated glass obtained in the manner as described above. Here, both ends of the interlayer film part in the direction that is perpendicular to the direction connecting the one end and the other end of the interlayer film part, and the thickness direction of the interlayer film part are respectively called a second one end and a second other end. The direction connecting the second one end and the second other end of the interlayer film part is the lengthwise direction of the interlayer film. Visible light transmittance was measured for each laminated glass, in a region (measurement region) existing between the second one end and the position of 5 cm inwardly of the laminated glass from the second one end, and in a region existing between the second other end and the position of 5 cm inwardly of the laminated glass from the second other end.

Specifically, laminated glass (1) was placed at a position 13 cm apart from the integrating sphere on the optical path between the light source and the integrating sphere, in parallel with the normal line of the light axis such that only the parallel light having penetrated laminated glass (1) was received by the integrating sphere, and spectral transmittance was measured. From the obtained spectral transmittance, visible light transmittance of laminated glass (1) was calculated. In the same manner, visible light transmittance was calculated for all the laminated glasses. In this manner, visible light transmittance of the laminated glass was measured along the direction connecting one end and the other end of the interlayer film part in the laminated glass, and for each laminated glass, a maximum value ($Tv_{max}$) and a minimum value ($Tv_{min}$) of visible light transmittance in each of the measurement regions were determined. The measurement conditions included a scan speed: 300 nm/min, and a slit width: 8 nm, and other measurement conditions conformed to JIS R3106:1998.

(2) Measurement of Distance X, Distance Y, and Distance Z

From the measurement result of the measured visible light transmittance, each measurement region of each laminated glass was segmented into the following regions.

Light color part: the region where Tv is more than ($0.1Tv_{min}+0.9Tv_{max}$), and $Tv_{max}$ or less Gradation part: the region where Tv is ($0.9Tv_{min}+0.1Tv_{max}$) or more, and ($0.1Tv_{min}+0.9Tv_{max}$) or less, and Tv increases from one end side toward the other end side of the interlayer film part Dark color part: the region where Tv is $Tv_{min}$ or more, and less than ($0.9Tv_{min}+0.1Tv_{max}$)

Colored part: the combined region of the dark color part and the gradation part

According to the above segmentation, distance X, distance Y, and distance Z were determined. For one laminated glass, respectively two distances X, distance Y, and distances X are obtained.

Distance X: the distance from one end of the interlayer film part to a tip of a colored part on the other end side of the interlayer film part (distance from one end of the interlayer film part to a boundary between the light color part and the gradation part)

Distance Y: the distance of the colored part in the direction connecting the one end and the other end of the interlayer film part Distance Z: the distance of gradation part in the direction connecting one end and the other end of the interlayer film part From measurement results of each measurement region (50 positions in total) of 20 laminated glasses (1) to (20) (Examples 1 to 37 and Comparative Examples 1 and 2), distance X, distance Y, and distance Z were determined.

From each obtained distance X, a maximum value $X_{max}$ of distance X, a minimum value $X_{min}$ of distance X, and an average value $X_{ave}$ of distance X were determined. From each obtained distance Y, a maximum value $Y_{max}$ of distance Y, a minimum value $Y_{min}$ of distance Y, and an average value $Y_{ave}$ of distance Y were determined. From each obtained distance Z, a maximum value $Z_{max}$ of distance Z, a minimum value $Z_{min}$ of distance Z, and an average value $Z_{ave}$ of distance Z were determined.

(3) Thicknesses of First Resin Layer and Second Resin Layer in Dark Color Part and Light Color Part An obtained interlayer film for laminated glass was cut parallel with the film thickness direction with a single-edged razor blade. Then, the cut cross section was observed with a microscope ("DSX-100" available from Olympus Corporation), and thicknesses of the first resin layer and the second resin layer in the dark color part and the light color part were measured using measurement software in the attached software. Specifically, each thickness was measured in the following manner.

Thickness in dark color part: thicknesses of the first resin layer and the second resin layer when cut at the position of $Tv_{min}$ and observed were measured.

Thickness in light color part: thicknesses of the first resin layer and the second resin layer when cut at the position of $Tv_{max}$ and observed were measured.

(4) Appearance Designability (Variation in Position of Tip of Colored Part (Tip of Gradation Part))

Twenty laminated glasses (1) to (20) (Examples 1 to 37 and Comparative Examples 1 and 2) were arranged in the following first, second and third arrangement orders (the state shown in FIG. 23).

First arrangement order: (1), (2), (3), (4), (5), (6), (7), (8), (9), (10), (11), (12), (13), (14), (15), (16), (17), (18), (19), (20)

Second arrangement order: (1), (20), (2), (19), (3), (18), (4), (17), (5), (16), (6), (15), (7), (14), (8), (13), (9), (12), (10), (11)

Third arrangement order: (1), (11), (2), (12), (3), (13), (4), (14), (5), (15), (6), (16), (7), (17), (8), (18), (9), (19), (10), (20)

The position of the tip of the colored part (tip of the gradation part) was visually checked. In the first arrangement order, the first number of raters who answered that variation in the position of the tip of the colored part (tip of the gradation part) was large among ten raters was counted. In the second arrangement order, the second number of raters who answered that variation in the position of the tip of the colored part (tip of the gradation part) was large among ten raters was counted. In the third arrangement order, the third number of raters who answered that variation in the position of the tip of the colored part (tip of the gradation part) was large among ten raters was counted. Ten raters judged the appearance designability according to the following criteria.

[Criteria for Judgement in Appearance Designability]

∘∘: average of the first number, the second number and the third number who answered that variation was large is 0 or less ∘: average of the first number, the second number and the third number who answered that variation was large is more than 0 and 2 or less.

Δ: average of the first number, the second number and the third number who answered that variation was large is more than 2 and 4 or less.

x: average of the first number, the second number and the third number who answered that variation was large is more than 4

Compositions and blending amounts of the resin compositions for forming the first, second, third, and fourth resin layers are shown in Table 1 below. Extrusion conditions in preparing interlayer films are shown in Table 2. The details and the results of interlayer film parts and laminated glasses are shown in the following Tables 3 to 11.

TABLE 1

| | | | | Composition of resin layer | | | | | | | | |
|---|---|---|---|---|---|---|---|---|---|---|---|---|
| | | | Thermoplastic resin | | | | Plasticizer | | Coloring agent | | Heat shielding particles | |
| | | | Acetal | Hydroxyl | Acetyl | | | | | | | |
| Kind of resin composition | | Kind | Polymerization degree | group amount [mol %] | group amount [mol %] | group amount [mol %] | Kind | Content [parts by mass] | Kind | Content [parts by mass] | Kind | Content [parts by mass] |
| First resin layer | A1 | PVB1 | 1700 | 69 | 30 | 1 | 100 | 3GO | 40 | — | — | — | — |
| | A2 | PVB1 | 1700 | 69 | 30 | 1 | 100 | 3GO | 36 | — | — | — | — |
| | A3 | PVB1 | 1700 | 69 | 30 | 1 | 100 | 3GO | 40 | Black pigment | 0.013 | — | — |
| | A4 | PVB1 | 1700 | 69 | 30 | 1 | 100 | 3GO | 40 | Black pigment | 0.027 | — | — |
| | A5 | PVB1 | 1700 | 69 | 30 | 1 | 100 | 3GO | 40 | Blue pigment | 0.0064 | — | — |
| | A6 | PVB1 | 1700 | 69 | 30 | 1 | 100 | 3GO | 40 | — | — | ITO | 0.15 |
| | A7 | PVB1 | 1700 | 69 | 30 | 1 | 100 | 3GO | 40 | — | — | ITO | 0.6 |
| | A8 | PVB1 | 1700 | 69 | 30 | 1 | 100 | 3GO | 40 | — | — | CWO | 0.4 |
| Second resin layer | B1 | PVB1 | 1700 | 69 | 30 | 1 | 100 | 3GO | 40 | Calcium carbonate | 6.13 | — | — |
| | B2 | PVB1 | 1700 | 69 | 30 | 1 | 100 | 3GO | 40 | Calcium carbonate | 4.67 | — | — |
| | B3 | PVB1 | 1700 | 69 | 30 | 1 | 100 | 3GO | 40 | Calcium carbonate | 3.07 | — | — |
| | B4 | PVB1 | 1700 | 69 | 30 | 1 | 100 | 3GO | 40 | Calcium carbonate | 7.73 | — | — |
| | B5 | PVB1 | 1700 | 69 | 30 | 1 | 100 | 3GO | 40 | Calcium carbonate | 3.87 | — | — |
| | B6 | PVB2 | 1700 | 70 | 18 | 12 | 100 | 3GO | 76 | Calcium carbonate | 6.13 | — | — |
| | B7 | PVB3 | 2300 | 70 | 18 | 12 | 100 | 3GO | 76 | Calcium carbonate | 6.13 | — | — |
| | B8 | PVB4 | 3300 | 70 | 18 | 12 | 100 | 3GO | 76 | Calcium carbonate | 6.13 | — | — |
| | B9 | PVB5 | 1700 | 74 | 18 | 8 | 100 | 3GO | 76 | Calcium carbonate | 6.13 | — | — |
| | B10 | PVB1 | 1700 | 69 | 30 | 1 | 100 | 3GO | 40 | Calcium carbonate | 2.7 | — | — |
| | C1 | PVB1 | 1700 | 69 | 30 | 1 | 100 | 3GO | 40 | Black pigment | 0.13 | — | — |
| | D1 | PVB1 | 1700 | 69 | 30 | 1 | 100 | 3GO | 40 | Blue pigment | 0.33 | — | — |

TABLE 1-continued

| | | | | Composition of resin layer | | | | | | | | |
|---|---|---|---|---|---|---|---|---|---|---|---|---|
| | | | Thermoplastic resin | | | | Plasticizer | | Coloring agent | | Heat shielding particles | |
| Kind of resin composition | | Kind | Polymerization degree | Acetal group amount [mol %] | Hydroxyl group amount [mol %] | Acetyl group amount [mol %] | Content [parts by mass] | Kind | Content [parts by mass] | Kind | Content [parts by mass] | Kind | Content [parts by mass] |
| Third resin layer | E1 | PVB2 | 1700 | 70 | 18 | 12 | 100 | 3GO | 76 | — | — | — | — |
| | E2 | PVB4 | 3300 | 70 | 18 | 12 | 100 | 3GO | 76 | — | — | — | — |
| | E3 | PVB5 | 1700 | 74 | 18 | 8 | 100 | 3GO | 76 | — | — | — | — |
| | A1 | PVB1 | 1700 | 69 | 30 | 1 | 100 | 3GO | 40 | — | — | — | — |
| | A6 | PVB1 | 1700 | 69 | 30 | 1 | 100 | 3GO | 40 | — | — | ITO | 0.15 |
| Fourth resin layer | F1 | PVB1 | 1700 | 69 | 30 | 1 | 100 | 3GO | 36 | — | — | — | — |

TABLE 2

| | Extruder for resin layer | |
|---|---|---|
| Type of extrusion condition | Inlet pressure variation of gear pump 1 [$10^5$ Pa] | Inlet pressure variation of gear pump 2 [$10^5$ Pa] |
| a1 | 30 | 4 |
| a2 | 45 | 6 |
| a3 | 45 | 10 |
| a4 | 30 | — |
| a5 | 40 | — |
| a6 | 48 | — |
| a7 | 80 | — |
| a8 | 65 | — |
| b1 | 30 | — |
| b2 | 20 | — |

TABLE 3

| | | | | Example 1 | Example 2 | Example 3 | Example 4 | Example 5 | Example 6 |
|---|---|---|---|---|---|---|---|---|---|
| Blending condition, production condition | First resin layer | Material | [—] | A1 | A1 | A1 | A1 | A1 | A1 |
| | | Extrusion condition | [—] | a4 | a4 | a4 | a4 | a2 | a2 |
| | Second resin layer | Material | [—] | B1 | B2 | B3 | B4 | B1 | B3 |
| | | Extrusion condition | [—] | b1 | b1 | b1 | b2 | b1 | b1 |
| | Entire interlayer film | Sectional shape | [—] | FIG. 2 | FIG. 2 | FIG. 2 | FIG. 2 | FIG. 2 | FIG. 2 |
| | | Width | [mm] | 1800 | 1850 | 2600 | 2300 | 1800 | 1800 |
| | | Kind | [—] | Interlayer film 1 | Interlayer film 2 | Interlayer film 3 | Interlayer film 4 | Interlayer film 5 | Interlayer film 6 |
| Colored part | Entire colored part | Xmax, Ymax | [mm] | 803 | 860 | 803 | 803 | 802 | 1005 |
| | | Xmin, Ymin | [mm] | 790 | 845 | 790 | 792 | 788 | 996 |
| | | Zave, Yave | [mm] | 800 | 850 | 800 | 800 | 800 | 1000 |
| | | \|Xmax-Xmin\|/Xave \|Ymax-Ymin\|/Yave | [—] | 0.016 | 0.018 | 1.016 | 0.014 | 0.005 | 0.009 |
| | Gradation part | Zmax | [mm] | 205 | 185 | 360 | 205 | 305 | 355 |
| | | Zmin | [mm] | 195 | 175 | 340 | 200 | 295 | 345 |
| | | Zave | [mm] | 200 | 180 | 350 | 195 | 300 | 350 |
| | | \|Zmax-Zmin\|/Zave | [—] | 0.050 | 0.056 | 0.057 | 0.026 | 0.033 | 0.029 |
| | Dark color part | Thickness of first resin layer | [μm] | 500 | 500 | 200 | 500 | 500 | 200 |
| | | Thickness of second resin layer | [μm] | 300 | 300 | 600 | 300 | 300 | 600 |
| | | Visible light transmittance | [%] | 1.0 | 3.0 | 1.0 | 0.5 | 1 | 1.0 |
| | Light color part | Thickness of first resin layer | [μm] | 800 | 800 | 800 | 800 | 800 | 800 |
| | | Thickness of second resin layer | [μm] | 0 | 0 | 0 | 0 | 0 | 0 |

TABLE 3-continued

|  |  |  | Example 1 | Example 2 | Example 3 | Example 4 | Example 5 | Example 6 |
|---|---|---|---|---|---|---|---|---|
|  | Maximum value of distance in direction connecting one end and the other end of interlayer film part | [mm] | 1003 | 1010 | 1803 | 1503 | 1002 | 805 |
|  | Minimum value of distance in direction connecting one end and the other end of interlayer film part | [mm] | 990 | 997 | 1790 | 1490 | 998 | 796 |
|  | Average value of distance in direction connecting one end and the other end of interlayer film part | [mm] | 1000 | 1000 | 1800 | 1500 | 1000 | 800 |
|  | Visible light transmittance | [%] | 88 | 88 | 88 | 88 | 88 | 88 |
| Evaluation | Appearance designability | [—] | ? | ? | ? | ? | ?? | ?? |

TABLE 4

|  |  |  |  | Example 7 | Example 8 | Example 9 | Example 10 | Example 11 | Example 12 |
|---|---|---|---|---|---|---|---|---|---|
| Blending condition, production condition | First resin layer | Material | [—] | A1 | A1 | A1 | A1 | A2 | A2 |
|  |  | Extrusion condition | [—] | a3 | a5 | a2 | a2 | a4 | a5 |
|  | Second resin layer | Material | [—] | B4 | B5 | C1 | D1 | B6 | B7 |
|  |  | Extrusion condition | [—] | b1 | b1 | b1 | b1 | b2 | b2 |
|  | Entire interlayer film | Sectional shape | [—] | FIG. 2 | FIG. 2 | FIG. 2 | FIG. 2 | FIG. 2 | FIG. 2 |
|  |  | Width | [mm] | 2600 | 1800 | 1800 | 1800 | 2300 | 2100 |
|  |  | Kind | [—] | Interlayer film 7 | Interlayer film 8 | Interlayer film 9 | Interlayer film 10 | Interlayer film 11 | Interlayer film 12 |
| Colored part | Entire colored part | Xmax, Ymax | [mm] | 605 | 305 | 1005 | 1005 | 805 | 815 |
|  |  | Xmin, Ymin | [mm] | 595 | 295 | 996 | 996 | 790 | 790 |
|  |  | Xave, Yave | [mm] | 600 | 300 | 1000 | 1000 | 800 | 800 |
|  |  | \|Xmax-Xmin\|/Xave \|Ymax-Ymin\|/Yave | [—] | 0.017 | 0.033 | 0.009 | 0.009 | 0.019 | 0.031 |
|  | Gradation part | Zmax | [mm] | 90 | 85 | 305 | 305 | 203 | 203 |
|  |  | Zmin | [mm] | 85 | 78 | 298 | 299 | 196 | 196 |
|  |  | Zave | [mm] | 87 | 80 | 300 | 300 | 200 | 200 |
|  |  | \|Zmax-Zmin\|/Zave | [—] | 0.057 | 0.088 | 0.023 | 0.023 | 0.035 | 0.035 |
|  | Dark color part | Thickness of first resin layer | [μm] | 500 | 200 | 200 | 200 | 500 | 500 |
|  |  | Thickness of second resin layer | [μm] | 300 | 600 | 600 | 600 | 300 | 300 |
|  |  | Visible light transmittance | [%] | 0.5 | 0.5 | 1.0 | 1.6 | 1.0 | 1.0 |
| Light color part |  | Thickness of first resin layer | [μm] | 800 | 800 | 800 | 800 | 800 | 800 |
|  |  | Thickness of second resin layer | [μm] | 0 | 0 | 0 | 0 | 0 | 0 |
|  |  | Maximum value of distance in direction connecting one end and the other end of interlayer film part | [mm] | 2002 | 1504 | 805 | 805 | 1505 | 1310 |
|  |  | Minimum value of distance in direction connecting one end and the other end of interlayer film part | [mm] | 1994 | 1495 | 796 | 796 | 1490 | 1390 |

TABLE 4-continued

|  |  |  | Example 7 | Example 8 | Example 9 | Example 10 | Example 11 | Example 12 |
|---|---|---|---|---|---|---|---|---|
|  | Average value of distance in direction connecting one end and the other end of interlayer film part | [mm] | 2000 | 1500 | 800 | 800 | 1500 | 130 |
|  | Visible light transmittance | [%] | 88 | 88 | 88 | 88 | 88 | 88 |
| Evaluation | Appearance designability | [—] | ?? | ?? | ?? | ?? | Δ | Δ |

TABLE 5

|  |  |  |  | Example 13 | Example 14 | Example 15 | Example 16 | Example 17 | Comparative Example 1 | Comparative Example 2 |
|---|---|---|---|---|---|---|---|---|---|---|
| Blending condition, production condition | First resin layer | Material | [—] | A2 | A1 | A1 | A1 | A1 | A1 | A1 |
|  |  | Extrusion condition | [—] | a5 | a6 | a1 | a1 | a8 | a7 | a7 |
|  | Second resin layer | Material | [—] | B8 | B9 | B1 | B1 | B1 | B1 | B3 |
|  |  | Extrusion condition | [—] | b1 | b1 | b1 | b2 | b1 |  | b1 |
|  | Entire interlayer film | Sectional shape | [—] | FIG. 2 | FIG. 2 | FIG. 2 | FIG. 2 | FIG. 2 | FIG. 2 | FIG. 2 |
|  |  | Width | [mm] | 1900 | 1815 | 1800 | 1801 | 1801 | 1800 | 1790 |
|  |  | Kind | [—] | Interlayer film 13 | Interlayer film 14 | Interlayer film 15 | Interlayer film 16 | Interlayer film 17 | Interlayer film 10 | Interlayer film 19 |
| Colored part | Entire colored part | Xmax, Ymax | [mm] | 815 | 830 | 804 | 802 | 835 | 880 | 880 |
|  |  | Xmin, Ymin | [mm] | 790 | 790 | 797 | 797 | 760 | 790 | 790 |
|  |  | Zave, Yave | [mm] | 800 | 850 | 800 | 800 | 800 |  | 1000 |
|  |  | \|Xmax-Xmin\|/Xave \|Ymax-Ymin\|/Yave | [—] | 0.031 | 0.049 | 1.009 | 0.006 | 0.095 | 0.113 | 0.114 |
|  | Gradation part | Zmax | [mm] | 203 | 210 | 203 | 202 | 209 | 320 | 365 |
|  |  | Zmin | [mm] | 197 | 195 | 198 | 198 | 191 | 285 | 341 |
|  |  | Zave | [mm] | 200 | 200 | 200 | 200 | 200 | 300 | 350 |
|  |  | \|Zmax-Zmin\|/Zave | [—] | 0.030 | 0.075 | 0.025 | 0.020 | 0.090 | 0.117 | 0.069 |
|  | Dark color part | Thickness of first resin layer | [μm] | 500 | 500 | 500 | 500 | 500 | 500 | 200 |
|  |  | Thickness of second resin layer | [μm] | 300 | 300 | 300 | 300 | 300 | 300 | 600 |
|  |  | Visible light transmittance | [%] | 1.0 | 1.0 | 1.0 | 1.0 | 1.0 | 1.0 | 1.0 |
| Light color part |  | Thickness of first resin layer | [μm] | 800 | 800 | 800 | 800 | 800 | 800 | 800 |
|  |  | Thickness of second resin layer | [μm] | 0 | 0 | 0 | 0 | 0 |  | 0 |
|  |  | Maximum value of distance in direction connecting one end and the other end of interlayer film part | [mm] | 1108 | 1015 | 1003 | 1003 | 1003 | 1080 | 1090 |
|  |  | Minimum value of distance in direction connecting one end and the other end of interlayer film part | [mm] | 1090 | 975 | 990 | 990 | 990 | 990 | 1000 |
|  |  | Average value of distance in direction connecting one end and the other end of interlayer film part | [mm] | 1100 | 1000 | 1000 | 1000 | 1000 | 1000 | 1000 |
|  |  | Visible light transmittance | [%] | 88 | 88 | 88 | 88 | 88 |  | 88 |
| Evaluation |  | Appearance designability | [—] | Δ | Δ | ?? | ?? | Δ | x | ? |

TABLE 6

| | | | | Example 18 | Example 19 | Example 20 | Example 21 | Example 22 | Example 23 | Example 24 |
|---|---|---|---|---|---|---|---|---|---|---|
| Blending condition, production condition | First resin layer | Material | [—] | A3 | A4 | A5 | A7 | A8 | A1 | A1 |
| | | Extrusion condition | [—] | a4 | a4 | a4 | a4 | a4 | a4 | a4 |
| | Second resin layer | Material | [—] | B1 | B2 | B2 | B3 | B3 | B5 | B10 |
| | | Extrusion condition | [—] | b1 | b1 | b1 | b1 | b1 | b1 | b1 |
| | Entire interlayer film | Sectional shape | [—] | FIG. 2 | FIG. 2 | FIG. 2 | FIG. 2 | FIG. 2 | FIG. 2 | FIG. 2 |
| | | Width | [mm] | 1450 | 1850 | 1100 | 1200 | 2600 | 1800 | 1800 |
| | | Kind | [—] | Interlayer film 20 | Interlayer film 21 | Interlayer film 22 | Interlayer film 23 | Interlayer film 24 | Interlayer film 25 | Interlayer film 26 |
| Colored part | Entire colored part | Xmax, Ymax | [mm] | 803 | 860 | 860 | 803 | 803 | 803 | 803 |
| | | Xmin, Ymin | [mm] | 790 | 845 | 845 | 790 | 790 | 790 | 790 |
| | | Zave, Yave | [mm] | 800 | 850 | 800 | 800 | 800 | 900 | 800 |
| | | \|Xmax-Xmin\|/Xave \|Ymax-Ymin\|/Yave | [—] | 0.016 | 0.018 | 1.018 | 0.016 | 0.016 | 0.016 | 0.016 |
| | Gradation part | Zmax | [mm] | 205 | 185 | 185 | 360 | 360 | 205 | 205 |
| | | Zmin | [mm] | 195 | 175 | 175 | 340 | 340 | 195 | 195 |
| | | Zave | [mm] | 200 | 180 | 180 | 350 | 350 | 200 | 2000 |
| | | \|Zmax-Zmin\|/Zave | [—] | 0.050 | 0.056 | 0.056 | 0.057 | 0.057 | 0.050 | 0.050 |
| | Dark color part | Thickness of first resin layer | [μm] | 500 | 500 | 500 | 200 | 200 | 500 | 500 |
| | | Thickness of second resin layer | [μm] | 300 | 300 | 300 | 600 | 600 | 300 | 300 |
| | | Visible light transmittance | [%] | 0.9 | 2.1 | 0.6 | 1.0 | 0.9 | 4.9 | 9.7 |
| Light color part | | Thickness of first resin layer | [μm] | 800 | 800 | 800 | 800 | 800 | 800 | 800 |
| | | Thickness of second resin layer | [μm] | 0 | 0 | 0 | 0 | 0 | | 0 |
| | | Maximum value of distance in direction connecting one end and the other end of interlayer film part | [mm] | 653 | 1010 | 260 | 403 | 1803 | 1003 | 1003 |
| | | Minimum value of distance in direction connecting one end and the other end of interlayer film part | [mm] | 640 | 997 | 243 | 390 | 1790 | 990 | 990 |
| | | Average value of distance in direction connecting one end and the other end of interlayer film part | [mm] | 650 | 1000 | 260 | 400 | 1800 | 1000 | 1000 |
| | | Visible light transmittance | [%] | 71 | 62 | 42 | 87 | 80 | 88 | 88 |
| Evaluation | | Appearance designability | [—] | ? | ? | ? | ? | ? | ? | ? |

TABLE 7

| | | | | Example 1 | Example 25 | Example 26 |
|---|---|---|---|---|---|---|
| Interlayer film | | Kind | [—] | Interlayer film 1 | Interlayer film 1 | Interlayer film |
| Glass member | | Long-side dimension | [mm] | 1800 | 1500 | 1400 |
| | | Distance from one end of interlayer film part | [mm] | 0 | 150 | 300 |
| Colored part | Entire colored part | Xmax, Ymax | [mm] | 803 | 653 | 503 |
| | | Xmin, Ymin | [mm] | 790 | 640 | 490 |
| | | Zave, Yave | [mm] | 800 | 650 | 500 |
| | | \|Xmax-Xmin\|/Xave \|Ymax-Ymin\|/Yave | [—] | 0.016 | 0.020 | 0.026 |
| | Gradation part | Zmax | [mm] | 205 | 205 | 205 |
| | | Zmin | [mm] | 195 | 191 | 195 |
| | | Zave | [mm] | 200 | 200 | 200 |
| | | \|Zmax-Zmin\|/Zave | [—] | 0.050 | 0.050 | 0.050 |

TABLE 7-continued

| Interlayer film | | Kind | [—] | Example 1 Interlayer film 1 | Example 25 Interlayer film 1 | Example 26 Interlayer film |
|---|---|---|---|---|---|---|
| | Dark color part | Thickness of first resin layer | [μm] | 500 | 500 | 500 |
| | | Thickness of second resin layer | [μm] | 300 | 300 | 300 |
| | | Visible light transmittance | [%] | 1.0 | 1.0 | 1.0 |
| | Light color part | Thickness of first resin layer | [μm] | 800 | 800 | 800 |
| | | Thickness of second resin layer | [μm] | 0 | 0 | 0 |
| | | Maximum value of distance in direction connecting one end and the other end of interlayer film part | [mm] | 1003 | 853 | 903 |
| | | Minimum value of distance in direction connecting one end and the other end of interlayer film part | [mm] | 990 | 840 | 890 |
| | | Average value of distance in direction connecting one end and the other end of interlayer film part | [mm] | 1000 | 850 | 900 |
| | | Visible light transmittance | [%] | 88 | 88 | 88 |
| Evaluation | | Appearance designability | [—] | ? | ? | ? |

TABLE 8

| Interlayer film | | Kind | [—] | Example 5 Interlayer film 5 | Example 27 Interlayer film 5 | Example 28 Interlayer film 5 |
|---|---|---|---|---|---|---|
| Glass member | | Long-side dimension | [mm] | 1800 | 1400 | 1300 |
| | | Distance from one end of interlayer film part | [mm] | 0 | 300 | 200 |
| Colored part | Entire colored part | Xmax, Ymax | [mm] | 802 | 502 | 602 |
| | | Xmin, Ymin | [mm] | 798 | 498 | 598 |
| | | Zave, Yave | [mm] | 800 | 500 | 600 |
| | | \|Xmax-Xmin\|/Xave \|Ymax-Ymin\|/Yave | [—] | 0.005 | 0.008 | 0.007 |
| | Gradation part | Zmax | [mm] | 305 | 305 | 305 |
| | | Zmin | [mm] | 295 | 295 | 295 |
| | | Zave | [mm] | 300 | 300 | 300 |
| | | \|Zmax-Zmin\|/Zave | [—] | 0.033 | 0.033 | 0.033 |
| | Dark color part | Thickness of first resin layer | [μm] | 500 | 500 | 500 |
| | | Thickness of second resin layer | [μm] | 300 | 300 | 300 |
| | | Visible light transmittance | [%] | 1.0 | 1.0 | 1.0 |
| | Light color part | Thickness of first resin layer | [μm] | 800 | 800 | 800 |
| | | Thickness of second resin layer | [μm] | 0 | 0 | 0 |

TABLE 8-continued

| Interlayer film | Kind | [—] | Example 5 Interlayer film 5 | Example 27 Interlayer film 5 | Example 28 Interlayer film 5 |
|---|---|---|---|---|---|
| | Maximum value of distance in direction connecting one end and the other end of interlayer film part | [mm] | 1002 | 902 | 702 |
| | Minimum value of distance in direction connecting one end and the other end of interlayer film part | [mm] | 998 | 898 | 698 |
| | Average value of distance in direction connecting one end and the other end of interlayer film part | [mm] | 1000 | 900 | 700 |
| | Visible light transmittance | [%] | 88 | 88 | 88 |
| Evaluation | Appearance designability | [—] | ?? | ?? | ?? |

TABLE 9

| Interlayer film | | Kind | [—] | Example 7 Interlayer film 7 | Example 29 Interlayer film 7 | Example 30 Interlayer film 7 |
|---|---|---|---|---|---|---|
| Glass member | | Long-side dimension | [mm] | 2600 | 2000 | 1500 |
| | | Distance from one end of interlayer film part | [mm] | 0 | 150 | 50 |
| Colored part | Entire colored part | Xmax, Ymax | [mm] | 605 | 455 | 555 |
| | | Xmin, Ymin | [mm] | 595 | 445 | 545 |
| | | Zave, Yave | [mm] | 600 | 450 | 550 |
| | | \|Xmax-Xmin\|/Xave \|Ymax-Ymin\|/Yave | [—] | 0.017 | 0.022 | 0.018 |
| | Gradation part | Zmax | [mm] | 90 | 90 | 90 |
| | | Zmin | [mm] | 85 | 85 | 85 |
| | | Zave | [mm] | 87 | 87 | 87 |
| | | \|Zmax-Zmin\|/Zave | [—] | 0.057 | 0.057 | 0.057 |
| | Dark color part | Thickness of first resin layer | [μm] | 500 | 500 | 500 |
| | | Thickness of second resin layer | [μm] | 300 | 300 | 300 |
| | | Visible light transmittance | [%] | 0.5 | 0.5 | 0.5 |
| | Light color part | Thickness of first resin layer | [μm] | 800 | 800 | 800 |
| | | Thickness of second resin layer | [μm] | 0 | 0 | 0 |
| | | Maximum value of distance in direction connecting one end and the other end of interlayer film part | [mm] | 2002 | 1552 | 952 |
| | | Minimum value of distance in direction connecting one end and the other end of interlayer film part | [mm] | 1994 | 1544 | 944 |

TABLE 9-continued

| Interlayer film | Kind | [—] | Example 7 Interlayer film 7 | Example 29 Interlayer film 7 | Example 30 Interlayer film 7 |
|---|---|---|---|---|---|
| | Average value of distance in direction connecting one end and the other end of interlayer film part | [mm] | 2000 | 1550 | 950 |
| | Visible light transmittance | [%] | 88 | 88 | 88 |
| Evaluation | Appearance designability | [—] | ? | ? | ? |

TABLE 10

| | | | | Example 31 | Example 32 | Example 33 |
|---|---|---|---|---|---|---|
| Blending condition, production condition | First resin layer | Material | [—] | A1 | A1 | A6 |
| | | Extrusion condition | [—] | a4 | a4 | a4 |
| | Second resin layer | Material | [—] | B4 | B4 | B |
| | | Extrusion condition | [—] | b2 | b2 | b2 |
| | | Fuctional film | [—] | 3M90S | XIR | 3M90S |
| | Third resin layer | Material | [—] | A1 | A1 | A6 |
| | | Extrusion condition | [—] | a4 | a4 | a4 |
| | Entire interlayer film | Sectional shape | [—] | FIG. 20 | FIG. 20 | FIG. 20 |
| | | Width | [mm] | 2300 | 2300 | 2300 |
| | | Kind | [—] | Interlayer film 27 | Interlayer film 28 | Interlayer film 29 |
| Colored part | Entire colored part | Xmax, Ymax | [mm] | 803 | 803 | 803 |
| | | Xmin, Ymin | [mm] | 792 | 792 | 792 |
| | | Zave, Yave | [mm] | 800 | 850 | 800 |
| | | \|Xmax-Xmin\|/Xave \|Ymax-Ymin\|/Yave | [—] | 0.014 | 0.014 | 1.014 |
| | Gradation part | Zmax | [mm] | 205 | 205 | 205 |
| | | Zmin | [mm] | 200 | 200 | 200 |
| | | Zave | [mm] | 195 | 195 | 195 |
| | | \|Zmax-Zmin\|/Zave | [—] | 0.026 | 0.026 | 0.026 |
| | Dark color part | Thickness of first resin layer | [μm] | 500 | 500 | 500 |
| | | Thickness of second resin layer | [μm] | 300 | 300 | 300 |
| | | Visible light transmittance | [%] | 0.5 | 0.4 | 0.4 |
| Light color part | | Thickness of first resin layer | [μm] | 800 | 800 | 800 |
| | | Thickness of second resin layer | [μm] | 0 | 0 | 0 |
| | | Maximum value of distance in direction connecting one end and the other end of interlayer film part | [mm] | 1503 | 1503 | 1503 |
| | | Minimum value of distance in direction connecting one end and the other end of interlayer film part | [mm] | 1490 | 1490 | 1490 |
| | | Average value of distance in direction connecting one end and the other end of interlayer film part | [mm] | 1500 | 1500 | 1500 |

TABLE 10-continued

|  |  |  | Example 31 | Example 32 | Example 33 |
|---|---|---|---|---|---|
|  | Visible light transmittance | [%] | 87 | 77 | 86 |
| Evaluation | Appearance designability | [—] | ? | ? | ? |

TABLE 11

|  |  |  |  | Example 34 | Example 35 | Example 36 | Example 37 |
|---|---|---|---|---|---|---|---|
| Blending condition, production condition | First resin layer | Material | [—] | A2 | A2 | A2 | A2 |
|  |  | Extrusion condition | [—] | a4 | a4 | a5 | a5 |
|  | Second resin layer | Material | [—] | B3 | B3 | B5 | B5 |
|  |  | Extrusion condition | [—] | b1 | b1 | b1 | b1 |
|  | Third resin layer | Material | [—] | E1 | E3 | E1 | E2 |
|  |  | Extrusion condition | [—] | A1 | A1 | A1 | A1 |
|  | Fourth resin layer | Material | [—] | F1 | F1 | F1 | F1 |
|  |  | Extrusion condition | [—] | a4 | a4 | a4 | a4 |
|  | Entire interlayer film | Sectional shape | [—] | FIG. 18 | FIG. 18 | FIG. 18 | FIG. 18 |
|  |  | Width | [mm] | 2600 | 2600 | 1800 | 1800 |
|  |  | Kind | [—] | Interlayer film 30 | Interlayer film 31 | Interlayer film 32 | Interlayer film 33 |
| Colored part | Entire colored part | Xmax, Ymax | [mm] | 806 | 809 | 308 | 308 |
|  |  | Xmin, Ymin | [mm] | 787 | 791 | 292 | 292 |
|  |  | Zave, Yave | [mm] | 800 | 800 | 300 | 300 |
|  |  | \|Xmax−Xmin\|/Xave \|Ymax−Ymin\|/Yave | [—] | 0.024 | 0.023 | 0.053 | 0.053 |
|  | Gradation part | Zmax | [mm] | 362 | 365 | 84 | 84 |
|  |  | Zmin | [mm] | 338 | 340 | 76 | 76 |
|  |  | Zave | [mm] | 350 | 350 | 80 | 80 |
|  |  | \|Zmax−Zmin\|/Zave | [—] | 0.069 | 0.071 | 0.100 | 0.100 |
|  | Dark color part | Thickness of first resin layer | [μm] | 200 | 200 | 200 | 200 |
|  |  | Thickness of second resin layer | [μm] | 600 | 600 | 600 | 600 |
|  |  | Visible light transmittance | [%] | 1.0 | 1.0 | 0.5 | 0.5 |
| Light color part |  | Thickness of first resin layer | [μm] | 800 | 800 | 800 | 800 |
|  |  | Thickness of second resin layer | [μm] | 0 | 0 | 0 | 0 |
|  |  | Maximum value of distance in direction connecting one end and the other end of interlayer film part | [mm] | 1801 | 1803 | 1504 | 1504 |
|  |  | Minimum value of distance in direction connecting one end and the other end of interlayer film part | [mm] | 1799 | 1798 | 1495 | 1495 |
|  |  | Average value of distance in direction connecting one end and the other end of interlayer film part | [mm] | 1800 | 1800 | 1500 | 1500 |
|  |  | Visible light transmittance | [%] | 88 | 88 | 88 | 88 |
| Evaluation |  | Appearance designability | [—] | Δ | Δ | Δ | Δ |

EXPLANATION OF SYMBOLS 1, 1A, 1B, 1C, 1D, 1E, 1F, 1G: First resin layer
2, 2A, 2B, 2C, 2D, 2E, 2F, 2G: Second resin layer
2X, 2AX, 2CX, 2DX, 2EX, 2FX, 2GX, 4GX: Gradation part
2BX: First gradation part
2Y, 2AY, 2CY, 2DY, 2EY, 2FY, 2GY, 4GY: Dark color part
2BZ: Second gradation part
3E, 3F, 3G: Third resin layer
4E, 4G: Fourth resin layer
5F: Functional film
11, 11A, 11B, 11C, 11D, 11E, 11F, 11G: Interlayer film
11P, 11AP, 11BP, 11CP, 11DP, 11EP, 11FP, 11GP: Interlayer film part
11a, 11Aa, 11Ba, 11Ca, 11Da, 11Ea, 11Fa, 11Ga: One end
11b, 11Ab, 11Bb, 11Cb, 11Db, 11Eb, 11Fb, 11Gb: Other end
21: First lamination glass member
22: Second lamination glass member
31, 31A, 31B, 31C, 31D, 31E, 31F, 31G: Laminated glass
51, 51A, 51B: Roll body
61: Winding core
71: Laminated glass set
81, 82: Laminated glass structure
91, 92: Connecting member
Q: Coloring agent

The invention claimed is:

1. A laminated glass set that is a set of a plurality of laminated glasses, wherein:
   each of the plurality of laminated glasses comprises a first lamination glass member, a second lamination glass member, and an interlayer film part arranged between the first lamination glass member and the second lamination glass member,
   the interlayer film part comprises a first end side, a second end side opposite to the first end side and a colored part, and the interlayer film part in each of the plurality of laminated glasses has an identical composition,
   the colored part comprising a gradation part where visible light transmittance increases from the first end side toward the second end side of the interlayer film part, and the gradation part forms a tip of the colored part on the second end side of the interlayer film part, and wherein:
   when a distance X from the first end side of the interlayer film part to the tip of the colored part on the second end side of the interlayer film part is measured in the plurality of laminated glasses, a set of distances X is obtained, a maximum value of the set of distances X is denoted by $X_{max}$, a minimum value of the set of distances X is denoted by $X_{min}$, and an average value of the set of distances X is denoted by $X_{ave}$, and the laminated glass set satisfies the following formula (1), or
   when a distance Y of the colored part in a direction connecting the first end side and the second end side of the interlayer film part is measured in the plurality of laminated glasses, a set of distances Y is obtained, a maximum value of the set of distances Y is denoted by $Y_{max}$, a minimum value of the set of distances Y is denoted by $Y_{min}$, and an average value of the set of distances Y is denoted by $Y_{ave}$, and the laminated glass set satisfies the following formula (2):

$$0.005 \leq (|X_{max}-X_{min}|)/X_{ave} \leq 0.1 \qquad \text{formula (1)}$$

$$0.005 \leq (|Y_{max}-Y_{min}|)/Y_{ave} \leq 0.1 \qquad \text{formula (2).}$$

2. The laminated glass set according to claim 1, wherein the laminated glass set satisfies the formula (1).

3. The laminated glass set according to claim 2, wherein the $X_{min}$ is 0.6 m or more.

4. The laminated glass set according to claim 1, wherein the tip of the colored part on the first end side of the interlayer film part reaches the first end side of the interlayer film part.

5. The laminated glass set according to claim 1, wherein the laminated glass set satisfies the formula (2).

6. The laminated glass set according to claim 5, wherein the $Y_{min}$ is 0.6 m or more.

7. The laminated glass set according to claim 1, wherein, when a distance Z of the gradation part in the direction connecting the first end side and the second end side of the interlayer film part is measured in the plurality of laminated glasses, a set of distances Z is obtained, a maximum value of the set of distances Z is denoted by $Z_{max}$, a minimum value of the set of distances Z is denoted by $Z_{min}$, and an average value of the set of distances Z is denoted by $Z_{ave}$, and the laminated glass set satisfies the following formula (3):

$$(|Z_{max}-Z_{min}|)/Z_{ave} \leq 0.1 \qquad \text{formula (3).}$$

8. The laminated glass set according to claim 1, wherein the interlayer film part further comprises a first resin layer and a second resin layer,
   wherein the first resin layer is arranged on a first surface side of the second resin layer,
   the second resin layer comprises a coloring agent, and
   the second resin layer forms the colored part.

9. The laminated glass set according to claim 8, wherein the coloring agent comprises calcium carbonate particles.

10. The laminated glass set according to claim 8, wherein the first resin layer is further arranged on a second surface side opposite to the first surface side of the second resin layer.

11. The laminated glass set according to claim 1, wherein
   the colored part has a dark color part having uniform visible light transmittance from the first end side toward the second end side of the interlayer film part, and
   in the interlayer film part, the dark color part is located closer to the first end side of the interlayer film part than the gradation part.

12. A laminated glass structure comprising:
   the laminated glass set according to claim 1, and
   a connecting member that connects the plurality of laminated glasses in the laminated glass set.

* * * * *